(12) United States Patent
Dowling et al.

(10) Patent No.: US 6,860,428 B1
(45) Date of Patent: Mar. 1, 2005

(54) OPTICAL SYMBOLOGIES IMAGER

(75) Inventors: John H. Dowling, Nashua, NH (US); Howard Stern, Greenlawn, NY (US); Harry R. McKinley, Southampton, MA (US); Philip E. McKinley, Westford, MA (US); Jason J. Lee, Concord, MA (US); Luis Alberto Figarella, Nashua, NH (US)

(73) Assignee: Robotic Vision Systems Inc., Canton, MA (US)

( * ) Notice: Subject to any disclaimer, the term of this patent is extended or adjusted under 35 U.S.C. 154(b) by 0 days.

(21) Appl. No.: 09/151,764

(22) Filed: Sep. 11, 1998

(51) Int. Cl.⁷ .............................. G06K 7/10; G06K 9/22
(52) U.S. Cl. .............. 235/462.45; 235/454; 235/462.24
(58) Field of Search ............................ 235/454, 462.01, 235/462.22, 462.23, 462.24, 462.41, 462.45, 462.25; 348/350

(56) References Cited

U.S. PATENT DOCUMENTS

| | | | | |
|---|---|---|---|---|
| 4,333,006 A | * | 6/1982 | Gorin et al. ........... | 235/462.34 |
| 4,794,237 A | * | 12/1988 | Ferrante ................. | 235/454 X |
| 4,800,256 A | * | 1/1989 | Broockman et al. ... | 235/462.22 X |
| 4,939,356 A | * | 7/1990 | Rando et al. ........ | 235/462.23 X |
| 5,192,856 A | * | 3/1993 | Schaham ............... | 235/462.24 |
| 5,363,137 A | * | 11/1994 | Suga et al. ............. | 348/350 X |
| 5,365,049 A | * | 11/1994 | Peng ..................... | 235/462.22 |
| 5,510,604 A | * | 4/1996 | England ................ | 235/462.25 |
| 5,563,658 A | * | 10/1996 | Parulski et al. ............. | 348/350 |
| 5,668,597 A | * | 9/1997 | Parulski et al. ............. | 348/350 |
| 5,710,417 A | * | 1/1998 | Joseph et al. .......... | 235/462.11 |
| 6,045,047 A | * | 4/2000 | Pidhirny et al. ........ | 235/454 X |
| 6,176,429 B1 | * | 1/2001 | Reddersen et al. .... | 235/462.25 |
| 6,250,551 B1 | * | 6/2001 | He et al. ................ | 235/454 X |
| 6,505,778 B1 | * | 1/2003 | Reddersen et al. .... | 235/462.25 |
| 6,598,797 B2 | * | 7/2003 | Lee ....................... | 235/462.22 |
| 6,746,864 B1 | * | 6/2004 | McNeil et al. ........... | 435/288.7 |

* cited by examiner

Primary Examiner—Jared J. Fureman
(74) Attorney, Agent, or Firm—Hoffman Wasson & Gitler

(57) ABSTRACT

A hand-held imager which is capable of reading both linear and two dimensional symbologies, which can perform focusing and illuminating steps quickly and accurately so as to eliminate variation in the position of the imager relative to the code becoming a negative factor, in which can operate in environment where the imager is anywhere from 1.5 inches to 16 inches from the code. The imager includes an imaging system having a focusing system, an illumination system, and a two-dimensional photodetector which forms an image of the coded symbology. After achieving targeting of the coded symbology, the scanning system adjusts the focus between multiple different focuses, and utilizes a portion of the two-dimensional photodetector to determine the optimum focus. Upon the determination of optimum focus, the focusing system is returned to the focusing configuration established in the initial focusing step, and an image is created using the entire two-dimensional photodetector. Optimum illumination is determined using the same two-dimensional photodetector.

10 Claims, 48 Drawing Sheets

P1 image

P2 image

P3 image

P4 image

P5 image

P6 image

P7 image

P8 image

P9 image

P10 image

P11 image

| Location | Confidential P_1 | P_6 | P_11 |
|---|---|---|---|
| 128 | 53 | 148 | 242 |
| 129 | 49 | 147 | 242 |
| 130 | 50 | 149 | 241 |
| 131 | 48 | 149 | 243 |
| 132 | 49 | 145 | 241 |
| 133 | 48 | 148 | 241 |
| 134 | 53 | 149 | 241 |
| 135 | 50 | 149 | 241 |
| 136 | 50 | 145 | 240 |
| 137 | 48 | 148 | 242 |
| 138 | 54 | 148 | 240 |
| 139 | 50 | 147 | 241 |
| 140 | 51 | 146 | 240 |
| 141 | 46 | 147 | 240 |
| 142 | 51 | 146 | 240 |
| 143 | 52 | 150 | 241 |
| 144 | 50 | 151 | 240 |
| 145 | 50 | 149 | 242 |
| 146 | 51 | 145 | 240 |
| 147 | 51 | 147 | 242 |
| 148 | 49 | 147 | 240 |
| 149 | 49 | 146 | 240 |
| 150 | 51 | 145 | 241 |
| 151 | 51 | 149 | 239 |
| 152 | 47 | 149 | 239 |
| 153 | 46 | 148 | 238 |
| 154 | 50 | 143 | 237 |
| 155 | 47 | 146 | 239 |
| 156 | 51 | 144 | 237 |
| 157 | 50 | 144 | 237 |
| 158 | 49 | 144 | 237 |
| 159 | 50 | 146 | 235 |
| 160 | 49 | 142 | 235 |
| 161 | 49 | 143 | 236 |
| 162 | 51 | 144 | 235 |
| 163 | 46 | 151 | 237 |

FIG.8A

| Location | Confidential P_1 | P_6 | P_11 |
|---|---|---|---|
| 164 | 49 | 150 | 234 |
| 165 | 48 | 144 | 238 |
| 166 | 52 | 149 | 234 |
| 167 | 48 | 148 | 235 |
| 168 | 49 | 145 | 234 |
| 169 | 52 | 144 | 236 |
| 170 | 47 | 142 | 234 |
| 171 | 45 | 148 | 234 |
| 172 | 49 | 146 | 230 |
| 173 | 50 | 144 | 234 |
| 174 | 51 | 147 | 233 |
| 175 | 47 | 140 | 233 |
| 176 | 45 | 145 | 233 |
| 177 | 47 | 141 | 233 |
| 178 | 47 | 142 | 231 |
| 179 | 46 | 139 | 231 |
| 180 | 48 | 140 | 229 |
| 181 | 49 | 140 | 230 |
| 182 | 47 | 140 | 233 |
| 183 | 46 | 137 | 231 |
| 184 | 49 | 141 | 230 |
| 185 | 51 | 141 | 229 |
| 186 | 49 | 141 | 233 |
| 187 | 51 | 143 | 230 |
| 188 | 49 | 142 | 228 |
| 189 | 46 | 142 | 231 |
| 190 | 47 | 138 | 228 |
| 191 | 48 | 139 | 228 |
| 192 | 48 | 138 | 226 |
| 193 | 45 | 138 | 229 |
| 194 | 48 | 141 | 229 |
| 195 | 46 | 141 | 231 |
| 196 | 48 | 141 | 230 |
| 197 | 46 | 141 | 231 |
| 198 | 48 | 142 | 231 |
| 199 | 44 | 139 | 230 |
| 200 | 47 | 140 | 229 |

FIG.8B

Confidential

| Location | P 1 | P 6 | P 11 |
|---|---|---|---|
| 201 | 46 | 138 | 227 |
| 202 | 44 | 136 | 227 |
| 203 | 45 | 139 | 225 |
| 204 | 47 | 138 | 224 |
| 205 | 43 | 136 | 223 |
| 206 | 46 | 136 | 221 |
| 207 | 43 | 134 | 218 |
| 208 | 44 | 137 | 218 |
| 209 | 45 | 141 | 215 |
| 210 | 47 | 138 | 214 |
| 211 | 44 | 140 | 211 |
| 212 | 47 | 138 | 207 |
| 213 | 44 | 136 | 204 |
| 214 | 45 | 137 | 200 |
| 215 | 46 | 140 | 199 |
| 216 | 48 | 140 | 196 |
| 217 | 47 | 140 | 188 |
| 218 | 48 | 135 | 182 |
| 219 | 43 | 133 | 179 |
| 220 | 45 | 134 | 171 |
| 221 | 43 | 135 | 170 |
| 222 | 42 | 136 | 163 |
| 223 | 43 | 131 | 162 |
| 224 | 43 | 134 | 154 |
| 225 | 40 | 134 | 149 |
| 226 | 42 | 128 | 146 |
| 227 | 37 | 122 | 145 |
| 228 | 39 | 115 | 139 |
| 229 | 37 | 109 | 137 |
| 230 | 35 | 97 | 128 |
| 231 | 24 | 92 | 124 |
| 232 | 24 | 82 | 120 |
| 233 | 20 | 72 | 115 |
| 234 | 22 | 60 | 110 |
| 235 | 22 | 55 | 106 |
| 236 | 21 | 44 | 102 |
| 237 | 17 | 41 | 100 |

FIG.8C

| Location | Confidential P_1 | P_6 | P_11 |
|---|---|---|---|
| 238 | 16 | 39 | 93 |
| 239 | 15 | 36 | 87 |
| 240 | 16 | 34 | 82 |
| 241 | 15 | 37 | 81 |
| 242 | 16 | 34 | 78 |
| 243 | 18 | 37 | 76 |
| 244 | 18 | 35 | 72 |
| 245 | 17 | 37 | 72 |
| 246 | 17 | 34 | 70 |
| 247 | 16 | 34 | 69 |
| 248 | 17 | 34 | 70 |
| 249 | 17 | 36 | 68 |
| 250 | 17 | 37 | 70 |
| 251 | 18 | 36 | 71 |
| 252 | 19 | 36 | 72 |
| 253 | 20 | 37 | 73 |
| 254 | 19 | 37 | 76 |
| 255 | 19 | 43 | 78 |
| 256 | 23 | 47 | 80 |
| 257 | 22 | 51 | 83 |
| 258 | 25 | 56 | 84 |
| 259 | 27 | 62 | 88 |
| 260 | 29 | 66 | 90 |
| 261 | 30 | 75 | 92 |
| 262 | 31 | 80 | 92 |
| 263 | 33 | 87 | 96 |
| 264 | 35 | 90 | 96 |
| 265 | 32 | 91 | 95 |
| 266 | 34 | 92 | 98 |
| 267 | 35 | 101 | 95 |
| 268 | 37 | 102 | 96 |
| 269 | 36 | 101 | 96 |
| 270 | 37 | 104 | 96 |
| 271 | 36 | 108 | 98 |
| 272 | 38 | 108 | 100 |
| 273 | 40 | 111 | 101 |
| 274 | 37 | 113 | 98 |

FIG.8D

| Location | Confidential | | |
| --- | --- | --- | --- |
| | P_1 | P_6 | P_11 |
| 275 | 34 | 116 | 101 |
| 276 | 38 | 115 | 101 |
| 277 | 35 | 117 | 101 |
| 278 | 36 | 113 | 101 |
| 279 | 34 | 112 | 101 |
| 280 | 37 | 106 | 97 |
| 281 | 33 | 103 | 94 |
| 282 | 36 | 98 | 96 |
| 283 | 36 | 98 | 95 |
| 284 | 37 | 96 | 90 |
| 285 | 34 | 95 | 89 |
| 286 | 33 | 92 | 86 |
| 287 | 32 | 97 | 86 |
| 288 | 34 | 89 | 82 |
| 289 | 34 | 91 | 81 |
| 290 | 36 | 89 | 76 |
| 291 | 32 | 86 | 75 |
| 292 | 35 | 88 | 70 |
| 293 | 32 | 87 | 69 |
| 294 | 35 | 88 | 69 |
| 295 | 31 | 87 | 71 |
| 296 | 33 | 88 | 68 |
| 297 | 31 | 87 | 70 |
| 298 | 30 | 82 | 69 |
| 299 | 28 | 76 | 70 |
| 300 | 28 | 70 | 68 |
| 301 | 27 | 67 | 69 |
| 302 | 23 | 62 | 70 |
| 303 | 20 | 59 | 71 |
| 304 | 20 | 52 | 72 |
| 305 | 18 | 48 | 75 |
| 306 | 18 | 39 | 74 |
| 307 | 16 | 37 | 77 |
| 308 | 15 | 34 | 78 |
| 309 | 16 | 35 | 82 |
| 310 | 15 | 30 | 82 |
| 311 | 14 | 33 | 87 |

FIG.8E

| Location | Confidential | | |
|---|---|---|---|
| | P_1 | P_6 | P_11 |
| 312 | 15 | 29 | 91 |
| 313 | 14 | 30 | 94 |
| 314 | 14 | 32 | 95 |
| 315 | 16 | 32 | 101 |
| 316 | 15 | 32 | 102 |
| 317 | 16 | 35 | 106 |
| 318 | 16 | 32 | 109 |
| 319 | 16 | 33 | 114 |
| 320 | 17 | 35 | 116 |
| 321 | 16 | 37 | 118 |
| 322 | 17 | 34 | 119 |
| 323 | 15 | 36 | 124 |
| 324 | 16 | 40 | 128 |
| 325 | 18 | 42 | 133 |
| 326 | 22 | 46 | 136 |
| 327 | 22 | 53 | 137 |
| 328 | 25 | 60 | 138 |
| 329 | 32 | 67 | 139 |
| 330 | 35 | 69 | 139 |
| 331 | 33 | 78 | 142 |
| 332 | 34 | 85 | 138 |
| 333 | 37 | 92 | 137 |
| 334 | 40 | 97 | 138 |
| 335 | 38 | 103 | 136 |
| 336 | 37 | 107 | 135 |
| 337 | 37 | 109 | 134 |
| 338 | 41 | 106 | 133 |
| 339 | 42 | 107 | 131 |
| 340 | 39 | 112 | 133 |
| 341 | 36 | 116 | 133 |
| 342 | 39 | 114 | 130 |
| 343 | 37 | 122 | 128 |
| 344 | 39 | 124 | 126 |
| 345 | 38 | 123 | 125 |
| 346 | 39 | 119 | 122 |
| 347 | 40 | 122 | 119 |
| 348 | 43 | 122 | 119 |

FIG.8F

Confidential

| Location | P_1 | P_6 | P_11 |
|---|---|---|---|
| 349 | 40 | 121 | 119 |
| 350 | 42 | 120 | 119 |
| 351 | 38 | 125 | 117 |
| 352 | 39 | 122 | 117 |
| 353 | 36 | 121 | 116 |
| 354 | 36 | 117 | 112 |
| 355 | 36 | 118 | 112 |
| 356 | 37 | 116 | 110 |
| 357 | 35 | 111 | 105 |
| 358 | 35 | 105 | 105 |
| 359 | 33 | 97 | 103 |
| 360 | 31 | 90 | 102 |
| 361 | 22 | 84 | 100 |
| 362 | 22 | 76 | 102 |
| 363 | 16 | 68 | 99 |
| 364 | 19 | 55 | 96 |
| 365 | 17 | 48 | 98 |
| 366 | 17 | 44 | 96 |
| 367 | 18 | 41 | 99 |
| 368 | 22 | 40 | 103 |
| 369 | 16 | 40 | 105 |
| 370 | 19 | 39 | 106 |
| 371 | 16 | 41 | 110 |
| 372 | 18 | 43 | 113 |
| 373 | 20 | 49 | 116 |
| 374 | 22 | 54 | 119 |
| 375 | 22 | 59 | 119 |
| 376 | 27 | 63 | 116 |
| 377 | 30 | 68 | 120 |
| 378 | 31 | 71 | 115 |
| 379 | 32 | 79 | 118 |
| 380 | 31 | 81 | 114 |
| 381 | 30 | 77 | 116 |
| 382 | 28 | 74 | 115 |
| 383 | 28 | 73 | 118 |
| 384 | 25 | 68 | 114 |

FIG.8G

Confidential

| Location | P_1 | P_6 | P_11 |
|---|---|---|---|
| 385 | 20 | 67 | 113 |
| 386 | 19 | 58 | 110 |
| 387 | 18 | 51 | 110 |
| 388 | 18 | 44 | 108 |
| 389 | 18 | 45 | 109 |
| 390 | 18 | 39 | 107 |
| 391 | 16 | 39 | 113 |
| 392 | 21 | 38 | 112 |
| 393 | 18 | 40 | 117 |
| 394 | 19 | 40 | 116 |
| 395 | 18 | 46 | 121 |
| 396 | 23 | 52 | 126 |
| 397 | 22 | 58 | 131 |
| 398 | 25 | 64 | 130 |
| 399 | 27 | 74 | 136 |
| 400 | 33 | 78 | 136 |
| 401 | 34 | 91 | 139 |
| 402 | 35 | 94 | 144 |
| 403 | 35 | 102 | 149 |
| 404 | 39 | 109 | 152 |
| 405 | 36 | 105 | 155 |
| 406 | 32 | 100 | 158 |
| 407 | 28 | 93 | 162 |
| 408 | 25 | 86 | 160 |
| 409 | 22 | 79 | 167 |
| 410 | 22 | 66 | 168 |
| 411 | 22 | 57 | 173 |
| 412 | 21 | 49 | 174 |
| 413 | 18 | 46 | 178 |
| 414 | 21 | 44 | 180 |
| 415 | 20 | 46 | 185 |
| 416 | 19 | 46 | 186 |
| 417 | 22 | 46 | 187 |
| 418 | 23 | 50 | 192 |
| 419 | 24 | 54 | 197 |
| 420 | 29 | 62 | 200 |

FIG.8H

| Location | Confidential P_1 | P_6 | P_11 |
|---|---|---|---|
| 421 | 26 | 72 | 205 |
| 422 | 31 | 79 | 207 |
| 423 | 34 | 87 | 207 |
| 424 | 39 | 101 | 212 |
| 425 | 40 | 111 | 214 |
| 426 | 43 | 118 | 217 |
| 427 | 44 | 125 | 219 |
| 428 | 44 | 131 | 221 |
| 429 | 45 | 134 | 222 |
| 430 | 47 | 139 | 221 |
| 431 | 44 | 139 | 223 |
| 432 | 47 | 136 | 224 |
| 433 | 44 | 139 | 225 |
| 434 | 47 | 141 | 226 |
| 435 | 46 | 141 | 228 |
| 436 | 48 | 139 | 228 |
| 437 | 48 | 143 | 228 |
| 438 | 50 | 142 | 229 |
| 439 | 44 | 143 | 228 |
| 440 | 49 | 140 | 225 |
| 441 | 47 | 141 | 229 |
| 442 | 51 | 145 | 227 |
| 443 | 48 | 141 | 225 |
| 444 | 46 | 140 | 224 |
| 445 | 47 | 145 | 228 |
| 446 | 52 | 143 | 226 |
| 447 | 47 | 147 | 228 |
| 448 | 47 | 146 | 226 |
| 449 | 46 | 144 | 228 |
| 450 | 48 | 148 | 229 |
| 451 | 48 | 147 | 227 |
| 452 | 50 | 144 | 226 |
| 453 | 50 | 143 | 229 |
| 454 | 49 | 143 | 223 |
| 455 | 47 | 145 | 226 |
| 456 | 49 | 144 | 226 |
| 457 | 46 | 141 | 229 |

FIG. 81

Confidential

| Location | P_1 | P_6 | P_11 |
|---|---|---|---|
| 458 | 45 | 141 | 226 |
| 459 | 46 | 141 | 228 |
| 460 | 48 | 143 | 226 |
| 461 | 47 | 143 | 229 |
| 462 | 49 | 140 | 226 |
| 463 | 48 | 144 | 226 |
| 464 | 47 | 143 | 225 |
| 465 | 47 | 143 | 228 |
| 466 | 46 | 143 | 225 |
| 467 | 45 | 142 | 223 |
| 468 | 45 | 144 | 224 |
| 469 | 45 | 145 | 227 |
| 470 | 45 | 142 | 228 |
| 471 | 46 | 145 | 228 |
| 472 | 49 | 142 | 226 |
| 473 | 48 | 144 | 228 |
| 474 | 48 | 144 | 229 |
| 475 | 50 | 146 | 229 |
| 476 | 51 | 140 | 228 |
| 477 | 48 | 142 | 230 |
| 478 | 43 | 142 | 228 |
| 479 | 46 | 139 | 228 |
| 480 | 47 | 141 | 226 |
| 481 | 46 | 144 | 227 |
| 482 | 51 | 146 | 226 |
| 483 | 49 | 142 | 228 |
| 484 | 50 | 141 | 229 |
| 485 | 48 | 142 | 225 |
| 486 | 50 | 140 | 224 |
| 487 | 52 | 140 | 224 |
| 488 | 51 | 137 | 224 |
| 489 | 48 | 139 | 227 |
| 490 | 50 | 142 | 225 |
| 491 | 45 | 145 | 224 |
| 492 | 47 | 146 | 225 |
| 493 | 46 | 141 | 227 |

FIG.8J

| Location | Confidential | | |
|---|---|---|---|
| | P_1 | P_6 | P_11 |
| 494 | 45 | 137 | 225 |
| 495 | 44 | 137 | 227 |
| 496 | 44 | 143 | 223 |
| 497 | 47 | 139 | 227 |
| 498 | 48 | 137 | 227 |
| 499 | 41 | 138 | 226 |
| 500 | 46 | 137 | 227 |
| 501 | 49 | 140 | 227 |
| 502 | 48 | 138 | 226 |
| 503 | 52 | 139 | 227 |
| 504 | 49 | 140 | 227 |
| 505 | 48 | 144 | 226 |
| 506 | 51 | 145 | 228 |
| 507 | 48 | 144 | 229 |
| 508 | 51 | 146 | 228 |
| 509 | 49 | 149 | 229 |
| 510 | 51 | 148 | 228 |
| 511 | 53 | 147 | 227 |

FIG.8K

Confidential

| Delta pk. | P_1 | P_2 | P_3 | P_4 | P_5 | P_6 |
|---|---|---|---|---|---|---|
| 0 | 0 | 0 | 0 | 0 | 0 | 0 |
| 1 | 0 | 0 | 0 | 0 | 0 | 0 |
| 2 | 0 | 0 | 0 | 0 | 0. | 0 |
| 3 | 0 | 0 | 0 | 0 | 0 | 0 |
| 4 | 0 | 0 | 0 | 0 | 0 | 0 |
| 5 | 0 | 0 | 0 | 0 | 0 | 0 |
| 6 | 0 | 0 | 0 | 0 | 0 | 0 |
| 7 | 0 | 0 | 0 | 0 | 0 | 0 |
| 8 | 0 | 0 | 0 | 0 | 0 | 0 |
| 9 | 0 | 0 | 0 | 0 | 0 | 0 |
| 10 | 0 | 0 | 0 | 0 | 0 | 0 |
| 11 | 0. | 0 | 0 | 0 | 0 | 0 |
| 12 | 14 | 10 | 7 | 12 | 10 | 11 |
| 13 | 17 | 10 | 3 | 9 | 4 | 10 |
| 14 | 21 | 17 | 8 | 10 | 10 | 9 |
| 15 | 21 | 10 | 9 | 7 | 9 | 7 |
| 16 | 22 | 20 | 8 | 9 | 7 | 9 |
| 17 | 33 | 20 | 12 | 7 | 10 | 6 |
| 18 | 29 | 14 | 9 | 8 | 10 | 4 |
| 19 | 42 | 18 | 3 | 5 | 9 | 5 |
| 20 | 34 | 19 | 15 | 7 | 5 | 10 |
| 21 | 49 | 19 | 13 | 7 | 7 | 6 |
| 22 | 51 | 17 | 16 | 13 | 9 | 8 |
| 23 | 46 | 18 | 9 | 6 | 8 | 5 |
| 24 | 57 | 26 | 16 | 11 | 6 | 5 |
| 25 | 32 | 13 | 12 | 10 | 7 | 3 |
| 26 | 43 | 24 | 18 | 9 | 6 | 5 |
| 27 | 21 | 14 | 10 | 9 | 5 | 8 |
| 28 | 16 | 31 | 11 | 9 | 8 | 8 |
| 29 | 13 | 25 | 9 | 7 | 9 | 6 |
| 30 | 9 | 40 | 12 | 11 | 6 | 4 |
| 31 | 9 | 41 | 7 | 9 | 6 | 9 |
| 32 | 9 | 34 | 15 | 10 | 9 | 7 |
| 33 | 19 | 22 | 12 | 12 | 7 | 5 |
| 34 | 36 | 34 | 12 | 14 | 5 | 8 |
| 35 | 29 | 26 | 9 | 10 | 8 | 5 |
| 36 | 41 | 27 | 18 | 7 | 8 | 5 |

FIG.10A

Confidential

| Delta pk. | P_1 | P_2 | P_3 | P_4 | P_5 | P_6 |
|---|---|---|---|---|---|---|
| 37 | 20 | 19 | 10 | 10 | 9 | 1 |
| 38 | 17 | 20 | 18 | 7 | 4 | 5 |
| 39 | 6 | 8 | 23 | 11 | 11 | 6 |
| 40 | 1 | 8 | 26 | 16 | 8 | 7 |
| 41 | 1 | 7 | 24 | 15 | 10 | 8 |
| 42 | 0 | 10 | 37 | 13 | 8 | 7 |
| 43 | 0 | 8 | 30 | 8 | 6 | 6 |
| 44 | 0 | 10 | 31 | 8 | 4 | 7 |
| 45 | 0 | 7 | 21 | 11 | 8 | 6 |
| 46 | 0 | 14 | 20 | 17 | 11 | 5 |
| 47 | 0 | 14 | 12 | 13 | 10 | 4 |
| 48 | 0 | 26 | 26 | 13 | 9 | 6 |
| 49 | 0 | 18 | 16 | 20 | 11 | 5 |
| 50 | 0 | 22 | 23 | 16 | 13 | 5 |
| 51 | 0 | 16 | 20 | 18 | 10 | 7 |
| 52 | 0 | 8 | 10 | 31 | 2 | 6 |
| 53 | 0 | 5 | 10 | 36 | 9 | 4 |
| 54 | 0 | 6 | 8 | 32 | 13 | 14 |
| 55 | 0 | 1 | 8 | 18 | 7 | 8 |
| 56 | 0 | 0 | 3 | 16 | 8 | 11 |
| 57 | 0 | 0 | 6 | 11 | 16 | 6 |
| 58 | 0 | 0 | 11 | 15 | 15 | 6 |
| 59 | 0 | 0 | 8 | 11 | 15 | 10 |
| 60 | 0 | 0 | 3 | 18 | 13 | 9 |
| 61 | 0 | 0 | 5 | 29 | 12 | 4 |
| 62 | 0 | 0 | 9 | 22 | 11 | 16 |
| 63 | 0 | 0 | 5 | 12 | 14 | 10 |
| 64 | 0 | 0 | 11 | 16 | 23 | 14 |
| 65 | 0 | 0 | 13 | 5 | 11 | 12 |
| 66 | 0 | 0 | 22 | 13 | 26 | 8 |
| 67 | 0 | 0 | 16 | 5 | 16 | 8 |
| 68 | 0 | 0 | 20 | 4 | 17 | 9 |
| 69 | 0 | 0 | 11 | 6 | 18 | 11 |
| 70 | 0 | 0 | 13 | 8 | 20 | 13 |
| 71 | 0 | 0 | 2 | 4 | 12 | 14 |
| 72 | 0 | 0 | 2 | 2 | 18 | 8 |
| 73 | 0 | 0 | 0 | 4 | 10 | 12 |

FIG. 10B

Confidential

| Delta pk. | P_1 | P_2 | P_3 | P_4 | P_5 | P_6 |
|---|---|---|---|---|---|---|
| 74 | 0 | 0 | 0 | 3 | 13 | 16 |
| 75 | 0 | 0 | 0 | 7 | 13 | 14 |
| 76 | 0 | 0 | 0 | 6 | 17 | 21 |
| 77 | 0 | 0 | 0 | 9 | 21 | 13 |
| 78 | 0 | 0 | 0 | 18 | 17 | 20 |
| 79 | 0 | 0 | 0 | 11 | 17 | 14 |
| 80 | 0 | 0 | 0 | 26 | 10 | 13 |
| 81 | 0 | 0 | 0 | 10 | 11 | 25 |
| 82 | 0 | 0 | 0 | 8 | 5 | 14 |
| 83 | 0 | 0 | 0 | 8 | 4 | 4 |
| 84 | 0 | 0 | 0 | 3 | 4 | 12 |
| 85 | 0 | 0 | 0 | 1 | 3 | 8 |
| 86 | 0 | 0 | 0 | 0 | 2 | 6 |
| 87 | 0 | 0 | 0 | 0 | 4 | 10 |
| 88 | 0 | 0 | 0 | 0 | 5 | 7 |
| 89 | 0 | 0 | 0 | 0 | 4 | 11 |
| 90 | 0 | 0 | 0 | 0 | 0 | 20 |
| 91 | 0 | 0 | 0 | 0 | 1 | 18 |
| 92 | 0 | 0 | 0 | 0 | 6 | 21 |
| 93 | 0 | 0 | 0 | 0 | 13 | 16 |
| 94 | 0 | 0 | 0 | 0 | 10 | 13 |
| 95 | 0 | 0 | 0 | 0 | 12 | 4 |
| 96 | 0 | 0 | 0 | 0 | 12 | 5 |
| 97 | 0 | 0 | 0 | 0 | 12 | 2 |
| 98 | 0 | 0 | 0 | 0 | 11 | 2 |
| 99 | 0 | 0 | 0 | 0 | 13 | 4 |
| 100 | 0 | 0 | 0 | 0 | 8 | 3 |
| 101 | 0 | 0 | 0 | 0 | 2 | 2 |
| 102 | 0 | 0 | 0 | 0 | 3 | 3 |
| 103 | 0 | 0 | 0 | 0 | 1 | 1 |
| 104 | 0 | 0 | 0 | 0 | 0 | 3 |
| 105 | 0 | 0 | 0 | 0 | 0 | 3 |
| 106 | 0 | 0 | 0 | 0 | 0 | 5 |
| 107 | 0 | 0 | 0 | 0 | 0 | 1 |
| 108 | 0 | 0 | 0 | 0 | 0 | 4 |
| 109 | 0 | 0 | 0 | 0 | 0 | 6 |
| 110 | 0 | 0 | 0 | 0 | 0 | 11 |

FIG.10C

Confidential

| Delta pk. | P_1 | P_2 | P_3 | P_4 | P_5 | P_6 |
|---|---|---|---|---|---|---|
| 111 | 0 | 0 | 0 | 0 | 0 | 9 |
| 112 | 0 | 0 | 0 | 0 | 0 | 18 |
| 113 | 0 | 0 | 0 | 0 | 0 | 14 |
| 114 | 0 | 0 | 0 | 0 | 0 | 13 |
| 115 | 0 | 0 | 0 | 0 | 0 | 9 |
| 116 | 0 | 0 | 0 | 0 | 0 | 8 |
| 117 | 0 | 0 | 0 | 0 | 0 | 1 |
| 118 | 0 | 0 | 0 | 0 | 0 | 1 |
| 119 | 0 | 0 | 0 | 0 | 0 | 0 |
| 120 | 0 | 0 | 0 | 0 | 0 | 0 |
| 121 | 0 | 0 | 0 | 0 | 0 | 0 |
| 122 | 0 | 0 | 0 | 0 | 0 | 0 |
| 123 | 0 | 0 | 0 | 0 | 0 | 0 |
| 124 | 0 | 0 | 0 | 0 | 0 | 0 |
| 125 | 0 | 0 | 0 | 0 | 0 | 0 |
| 126 | 0 | 0 | 0 | 0 | 0 | 0 |
| 127 | 0 | 0 | 0 | 0 | 0 | 0 |
| 128 | 0 | 0 | 0 | 0 | 0 | 0 |
| 129 | 0 | 0 | 0 | 0 | 0 | 0 |
| 130 | 0 | 0 | 0 | 0 | 0 | 0 |
| 131 | 0 | 0 | 0 | 0 | 0 | 0 |
| 132 | 0 | 0 | 0 | 0 | 0 | 0 |
| 133 | 0 | 0 | 0 | 0 | 0 | 0 |
| 134 | 0 | 0 | 0 | 0 | 0 | 0 |
| 135 | 0 | 0 | 0 | 0 | 0 | 0 |
| 136 | 0 | 0 | 0 | 0 | 0 | 0 |
| 137 | 0 | 0 | 0 | 0 | 0 | 0 |
| 138 | 0 | 0 | 0 | 0 | 0 | 0 |
| 139 | 0 | 0 | 0 | 0 | 0 | 0 |
| 140 | 0 | 0 | 0 | 0 | 0 | 0 |
| 141 | 0 | 0 | 0 | 0 | 0 | 0 |
| 142 | 0 | 0 | 0 | 0 | 0 | 0 |
| 143 | 0 | 0 | 0 | 0 | 0 | 0 |
| 144 | 0 | 0 | 0 | 0 | 0 | 0 |
| 145 | 0 | 0 | 0 | 0 | 0 | 0 |
| 146 | 0 | 0 | 0 | 0 | 0 | 0 |

FIG.10D

Confidential

| Delta pk. | P_1 | P_2 | P_3 | P_4 | P_5 | P_6 |
|---|---|---|---|---|---|---|
| 147 | 0 | 0 | 0 | 0 | 0 | 0 |
| 148 | 0 | 0 | 0 | 0 | 0 | 0 |
| 149 | 0 | 0 | 0 | 0 | 0 | 0 |
| 150 | 0 | 0 | 0 | 0 | 0 | 0 |
| 151 | 0 | 0 | 0 | 0 | 0 | 0 |
| 152 | 0 | 0 | 0 | 0 | 0 | 0 |
| 153 | 0 | 0 | 0 | 0 | 0 | 0 |
| 154 | 0 | 0 | 0 | 0 | 0 | 0 |
| 155 | 0 | 0 | 0 | 0 | 0 | 0 |
| 156 | 0 | 0 | 0 | 0 | 0 | 0 |
| 157 | 0 | 0 | 0 | 0 | 0 | 0 |
| 158 | 0 | 0 | 0 | 0 | 0 | 0 |
| 159 | 0 | 0 | 0 | 0 | 0 | 0 |
| 160 | 0 | 0 | 0 | 0 | 0 | 0 |
| 161 | 0 | 0 | 0 | 0 | 0 | 0 |
| 162 | 0 | 0 | 0 | 0 | 0 | 0 |
| 163 | 0 | 0 | 0 | 0 | 0 | 0 |
| 164 | 0 | 0 | 0 | 0 | 0 | 0 |
| 165 | 0 | 0 | 0 | 0 | 0 | 0 |
| 166 | 0 | 0 | 0 | 0 | 0 | 0 |
| 167 | 0 | 0 | 0 | 0 | 0 | 0 |
| 168 | 0 | 0 | 0 | 0 | 0 | 0 |
| 169 | 0 | 0 | 0 | 0 | 0 | 0 |
| 170 | 0 | 0 | 0 | 0 | 0 | 0 |
| 171 | 0 | 0 | 0 | 0 | 0 | 0 |
| 172 | 0 | 0 | 0 | 0 | 0 | 0 |
| 173 | 0 | 0 | 0 | 0 | 0 | 0 |
| 174 | 0 | 0 | 0 | 0 | 0 | 0 |
| 175 | 0 | 0 | 0 | 0 | 0 | 0 |
| 176 | 0 | 0 | 0 | 0 | 0 | 0 |
| 177 | 0 | 0 | 0 | 0 | 0 | 0 |
| 178 | 0 | 0 | 0 | 0 | 0 | 0 |
| 179 | 0 | 0 | 0 | 0 | 0 | 0 |
| 180 | 0 | 0 | 0 | 0 | 0 | 0 |
| 181 | 0 | 0 | 0 | 0 | 0 | 0 |
| 182 | 0 | 0 | 0 | 0 | 0 | 0 |
| 183 | 0 | 0 | 0 | 0 | 0 | 0 |

FIG.10E

Confidential

| Delta pk. | P_1 | P_2 | P_3 | P_4 | P_5 | P_6 |
|---|---|---|---|---|---|---|
| 184 | 0 | 0 | 0 | 0 | 0 | 0 |
| 185 | 0 | 0 | 0 | 0 | 0 | 0 |
| 186 | 0 | 0 | 0 | 0 | 0 | 0 |
| 187 | 0 | 0 | 0 | 0 | 0 | 0 |
| 188 | 0 | 0 | 0 | 0 | 0 | 0 |
| 189 | 0 | 0 | 0 | 0 | 0 | 0 |
| 190 | 0 | 0 | 0 | 0 | 0 | 0 |
| 191 | 0 | 0 | 0 | 0 | 0 | 0 |
| 192 | 0 | 0 | 0 | 0 | 0 | 0 |
| 193 | 0 | 0 | 0 | 0 | 0 | 0 |
| 194 | 0 | 0 | 0 | 0 | 0 | 0 |
| 195 | 0 | 0 | 0 | 0 | 0 | 0 |
| 196 | 0 | 0 | 0 | 0 | 0 | 0 |
| 197 | 0 | 0 | 0 | 0 | 0 | 0 |
| 198 | 0 | 0 | 0 | 0 | 0 | 0 |
| 199 | 0 | 0 | 0 | 0 | 0 | 0 |
| 200 | 0 | 0 | 0 | 0 | 0 | 0 |
| 201 | 0 | 0 | 0 | 0 | 0 | 0 |
| 202 | 0 | 0 | 0 | 0 | 0 | 0 |
| 203 | 0 | 0 | 0 | 0 | 0 | 0 |
| 204 | 0 | 0 | 0 | 0 | 0 | 0 |
| 205 | 0 | 0 | 0 | 0 | 0 | 0 |
| 206 | 0 | 0 | 0 | 0 | 0 | 0 |
| 207 | 0 | 0 | 0 | 0 | 0 | 0 |
| 208 | 0 | 0 | 0 | 0 | 0 | 0 |
| 209 | 0 | 0 | 0 | 0 | 0 | 0 |
| 210 | 0 | 0 | 0 | 0 | 0 | 0 |
| 211 | 0 | 0 | 0 | 0 | 0 | 0 |
| 212 | 0 | 0 | 0 | 0 | 0 | 0 |
| 213 | 0 | 0 | 0 | 0 | 0 | 0 |
| 214 | 0 | 0 | 0 | 0 | 0 | 0 |
| 215 | 0 | 0 | 0 | 0 | 0 | 0 |
| 216 | 0 | 0 | 0 | 0 | 0 | 0 |
| 217 | 0 | 0 | 0 | 0 | 0 | 0 |
| 218 | 0 | 0 | 0 | 0 | 0 | 0 |
| 219 | 0 | 0 | 0 | 0 | 0 | 0 |
| 220 | 0 | 0 | 0 | 0 | 0 | 0 |

FIG.10F

Confidential

| Delta pk. | P_1 | P_2 | P_3 | P_4 | P_5 | P_6 |
|---|---|---|---|---|---|---|
| 221 | 0 | 0 | 0 | 0 | 0 | 0 |
| 222 | 0 | 0 | 0 | 0 | 0 | 0 |
| 223 | 0 | 0 | 0 | 0 | 0 | 0 |
| 224 | 0 | 0 | 0 | 0 | 0 | 0 |
| 225 | 0 | 0 | 0 | 0 | 0 | 0 |
| 226 | 0 | 0 | 0 | 0 | 0 | 0 |
| 227 | 0 | 0 | 0 | 0 | 0 | 0 |
| 228 | 0 | 0 | 0 | 0 | 0 | 0 |
| 229 | 0 | 0 | 0 | 0 | 0 | 0 |
| 230 | 0 | 0 | 0 | 0 | 0 | 0 |
| 231 | 0 | 0 | 0 | 0 | 0 | 0 |
| 232 | 0 | 0 | 0 | 0 | 0 | 0 |
| 233 | 0 | 0 | 0 | 0 | 0 | 0 |
| 234 | 0 | 0 | 0 | 0 | 0 | 0 |
| 235 | 0 | 0 | 0 | 0 | 0 | 0 |
| 236 | 0 | 0 | 0 | 0 | 0 | 0 |
| 237 | 0 | 0 | 0 | 0 | 0 | 0 |
| 238 | 0 | 0 | 0 | 0 | 0 | 0 |
| 239 | 0 | 0 | 0 | 0 | 0 | 0 |
| 240 | 0 | 0 | 0 | 0 | 0 | 0 |
| 241 | 0 | 0 | 0 | 0 | 0 | 0 |
| 242 | 0 | 0 | 0 | 0 | 0 | 0 |
| 243 | 0 | 0 | 0 | 0 | 0 | 0 |
| 244 | 0 | 0 | 0 | 0 | 0 | 0 |
| 245 | 0 | 0 | 0 | 0 | 0 | 0 |
| 246 | 0 | 0 | 0 | 0 | 0 | 0 |
| 247 | 0 | 0 | 0 | 0 | 0 | 0 |
| 248 | 0 | 0 | 0 | 0 | 0 | 0 |
| 249 | 0 | 0 | 0 | 0 | 0 | 0 |
| 250 | 0 | 0 | 0 | 0 | 0 | 0 |
| 251 | 0 | 0 | 0 | 0 | 0 | 0 |
| 252 | 0 | 0 | 0 | 0 | 0 | 0 |
| 253 | 0 | 0 | 0 | 0 | 0 | 0 |
| 254 | 0 | 0 | 0 | 0 | 0 | 0 |
| 255 | 0 | 0 | 0 | 0 | 0 | 0 |

FIG. 10G

IMAGE p6:

ENTROPY SCORE    781
    MAX PIXEL VALUE    153
    MIN PIXEL VALUE    30

IMAGE p7:

ENTROPY SCORE    518
    MAX PIXEL VALUE    149
    MIN PIXEL VALUE    30

IMAGE p8:

ENTROPY SCORE    468
    MAX PIXEL VALUE    172
    MIN PIXEL VALUE    34

IMAGE p9:

ENTROPY SCORE    464
    MAX PIXEL VALUE    189
    MIN PIXEL VALUE    39

IMAGE p10:

ENTROPY SCORE    455
    MAX PIXEL VALUE    212
    MIN PIXEL VALUE    46

IMAGE p11:

ENTROPY SCORE    461
    MAX PIXEL VALUE    243
    MIN PIXEL VALUE    66

FIG.11

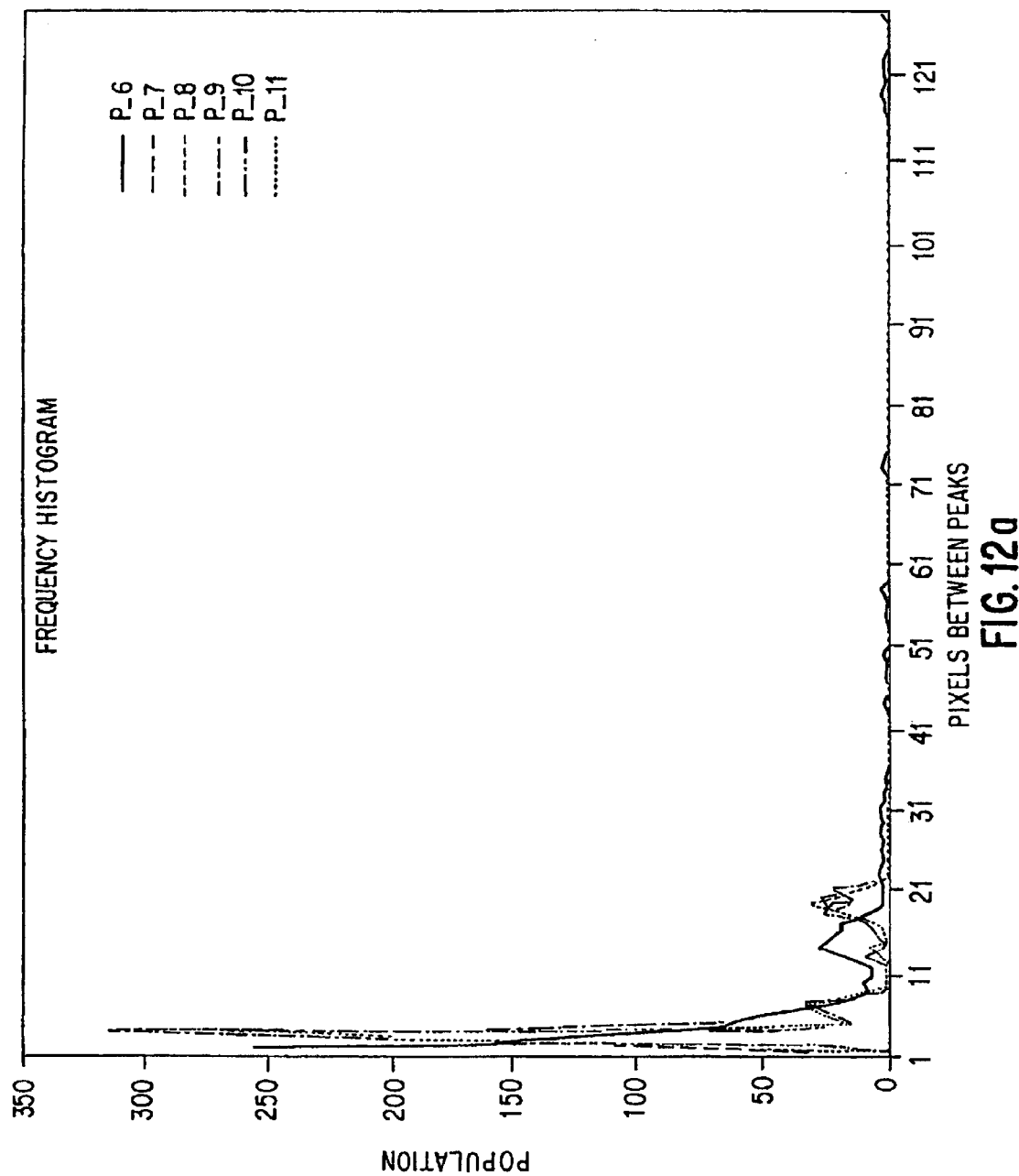

Confidential

| Delta pix. | P_6 | P_7 | P_8 | P_9 | P_10 | P_11 |
|---|---|---|---|---|---|---|
| 0 | 0 | 0 | 0 | 0 | 0 | 0 |
| 1 | 258 | 35 | 1 | 0 | 0 | 12 |
| 2 | 170 | 112 | 28 | 23 | 45 | 91 |
| 3 | 143 | 181 | 263 | 301 | 315 | 243 |
| 4 | 68 | 115 | 126 | 78 | 41 | 55 |
| 5 | 63 | 36 | 17 | 19 | 12 | 15 |
| 6 | 50 | 20 | 14 | 20 | 17 | 18 |
| 7 | 29 | 19 | 19 | 23 | 25 | 27 |
| 8 | 16 | 13 | 22 | 24 | 31 | 29 |
| 9 | 7 | 9 | 2 | 2 | 4 | 10 |
| 10 | 10 | 0 | 0 | 0 | 0 | 0 |
| 11 | 6 | 0 | 0 | 0 | 0 | 0 |
| 12 | 6 | 0 | 0 | 0 | 0 | 0 |
| 13 | 17 | 9 | 7 | 7 | 4 | 1 |
| 14 | 27 | 1 | 3 | 3 | 6 | 9 |
| 15 | 23 | 3 | 0 | 0 | 0 | 0 |
| 16 | 19 | 5 | 1 | 0 | 0 | 1 |
| 17 | 19 | 8 | 9 | 4 | 3 | 3 |
| 18 | 8 | 12 | 22 | 26 | 18 | 17 |
| 19 | 1 | 23 | 18 | 24 | 25 | 31 |
| 20 | 1 | 14 | 16 | 19 | 26 | 23 |
| 21 | 1 | 22 | 19 | 14 | 14 | 13 |
| 22 | 2 | 3 | 5 | 3 | 4 | 2 |
| 23 | 3 | 0 | 0 | 0 | 0 | 0 |
| 24 | 2 | 0 | 0 | 0 | 0 | 0 |
| 25 | 1 | 0 | 0 | 0 | 0 | 0 |
| 26 | 2 | 0 | 0 | 0 | 0 | 0 |
| 27 | 1 | 0 | 0 | 0 | 0 | 0 |
| 28 | 3 | 0 | 0 | 0 | 0 | 0 |
| 29 | 1 | 0 | 0 | 0 | 0 | 0 |
| 30 | 3 | 0 | 0 | 0 | 0 | 0 |
| 31 | 3 | 0 | 0 | 0 | 0 | 0 |
| 32 | 1 | 0 | 0 | 0 | 0 | 0 |
| 33 | 1 | 0 | 0 | 0 | 0 | 0 |
| 34 | 0 | 0 | 0 | 0 | 0 | 0 |
| 35 | 1 | 0 | 0 | 0 | 0 | 0 |
| 36 | 0 | 0 | 0 | 0 | 0 | 0 |

FIG.13A

Confidential

| Delta pix. | P_6 | P_7 | P_8 | P_9 | P_10 | P_11 |
|---|---|---|---|---|---|---|
| 37 | 0 | 0 | 0 | 0 | 0 | 0 |
| 38 | 0 | 0 | 0 | 0 | 0 | 0 |
| 39 | 0 | 0 | 0 | 0 | 0 | 0 |
| 40 | 0 | 0 | 0 | 0 | 0 | 0 |
| 41 | 0 | 0 | 0 | 0 | 0 | 0 |
| 42 | 0 | 0 | 0 | 0 | 0 | 0 |
| 43 | 0 | 0 | 0 | 0 | 0 | 0 |
| 44 | 1 | 0 | 0 | 0 | 0 | 0 |
| 45 | 0 | 0 | 0 | 0 | 0 | 0 |
| 46 | 0 | 0 | 0 | 0 | 0 | 0 |
| 47 | 1 | 0 | 0 | 0 | 0 | 0 |
| 48 | 1 | 0 | 0 | 0 | 0 | 0 |
| 49 | 0 | 0 | 0 | 0 | 0 | 0 |
| 50 | 2 | 0 | 0 | 0 | 0 | 0 |
| 51 | 0 | 0 | 0 | 0 | 0 | 0 |
| 52 | 0 | 0 | 0 | 0 | 0 | 0 |
| 53 | 0 | 0 | 0 | 0 | 0 | 0 |
| 54 | 1 | 0 | 0 | 0 | 0 | 0 |
| 55 | 1 | 0 | 0 | 0 | 0 | 0 |
| 56 | 0 | 0 | 0 | 0 | 0 | 0 |
| 57 | 1 | 0 | 0 | 0 | 0 | 0 |
| 58 | 3 | 0 | 0 | 0 | 0 | 0 |
| 59 | 0 | 0 | 0 | 0 | 0 | 0 |
| 60 | 0 | 0 | 0 | 0 | 0 | 0 |
| 61 | 0 | 0 | 0 | 0 | 0 | 0 |
| 62 | 0 | 0 | 0 | 0 | 0 | 0 |
| 63 | 0 | 0 | 0 | 0 | 0 | 0 |
| 64 | 0 | 0 | 0 | 0 | 0 | 0 |
| 65 | 0 | 0 | 0 | 0 | 0 | 0 |
| 66 | 0 | 0 | 0 | 0 | 0 | 0 |
| 67 | 0 | 0 | 0 | 0 | 0 | 0 |
| 68 | 0 | 0 | 0 | 0 | 0 | 0 |
| 69 | 0 | 0 | 0 | 0 | 0 | 0 |
| 70 | 0 | 0 | 0 | 0 | 0 | 0 |
| 71 | 0 | 0 | 0 | 0 | 0 | 0 |
| 72 | 0 | 0 | 0 | 0 | 0 | 0 |
| 73 | 2 | 0 | 0 | 0 | 0 | 0 |

FIG.13B

Confidential

| Delta pix. | P_6 | P_7 | P_8 | P_9 | P_10 | P_11 |
|---|---|---|---|---|---|---|
| 74 | 1 | 0 | 0 | 0 | 0 | 0 |
| 75 | 0 | 0 | 0 | 0 | 0 | 0 |
| 76 | 0 | 0 | 0 | 0 | 0 | 0 |
| 77 | 0 | 0 | 0 | 0 | 0 | 0 |
| 78 | 0 | 0 | 0 | 0 | 0 | 0 |
| 79 | 0 | 0 | 0 | 0 | 0 | 0 |
| 80 | 0 | 0 | 0 | 0 | 0 | 0 |
| 81 | 0 | 0 | 0 | 0 | 0 | 0 |
| 82 | 0 | 0 | 0 | 0 | 0 | 0 |
| 83 | 0 | 0 | 0 | 0 | 0 | 0 |
| 84 | 0 | 0 | 0 | 0 | 0 | 0 |
| 85 | 0 | 0 | 0 | 0 | 0 | 0 |
| 86 | 0 | 0 | 0 | 0 | 0 | 0 |
| 87 | 0 | 0 | 0 | 0 | 0 | 0 |
| 88 | 0 | 0 | 0 | 0 | 0 | 0 |
| 89 | 0 | 0 | 0 | 0 | 0 | 0 |
| 90 | 0 | 0 | 0 | 0 | 0 | 0 |
| 91 | 0 | 0 | 0 | 0 | 0 | 0 |
| 92 | 0 | 0 | 0 | 0 | 0 | 0 |
| 93 | 0 | 0 | 0 | 0 | 0 | 0 |
| 94 | 0 | 0 | 0 | 0 | 0 | 0 |
| 95 | 0 | 0 | 0 | 0 | 0 | 0 |
| 96 | 0 | 0 | 0 | 0 | 0 | 0 |
| 97 | 0 | 0 | 0 | 0 | 0 | 0 |
| 98 | 0 | 0 | 0 | 0 | 0 | 0 |
| 99 | 0 | 0 | 0 | 0 | 0 | 0 |
| 100 | 0 | 0 | 0 | 0 | 0 | 0 |
| 101 | 0 | 0 | 0 | 0 | 0 | 0 |
| 102 | 0 | 0 | 0 | 0 | 0 | 0 |
| 103 | 0 | 0 | 0 | 0 | 0 | 0 |
| 104 | 0 | 0 | 0 | 0 | 0 | 0 |
| 105 | 0 | 0 | 0 | 0 | 0 | 0 |
| 106 | 0 | 0 | 0 | 0 | 0 | 0 |
| 107 | 0 | 0 | 0 | 0 | 0 | 0 |
| 108 | 0 | 0 | 0 | 0 | 0 | 0 |
| 109 | 0 | 0 | 0 | 0 | 0 | 0 |
| 110 | 0 | 0 | 0 | 0 | 0 | 0 |

FIG.13C

Confidential

| Delta pix. | P_6 | P_7 | P_8 | P_9 | P_10 | P_11 |
|---|---|---|---|---|---|---|
| 111 | 0 | 0 | 0 | 0 | 0 | 0 |
| 112 | 0 | 0 | 0 | 0 | 0 | 0 |
| 113 | 0 | 0 | 0 | 0 | 0 | 0 |
| 114 | 0 | 0 | 0 | 0 | 0 | 0 |
| 115 | 0 | 0 | 0 | 0 | 0 | 0 |
| 116 | 0 | 0 | 0 | 0 | 0 | 0 |
| 117 | 1 | 0 | 0 | 0 | 0 | 0 |
| 118 | 1 | 0 | 0 | 0 | 0 | 0 |
| 119 | 2 | 0 | 0 | 0 | 0 | 0 |
| 120 | 0 | 0 | 0 | 0 | 0 | 0 |
| 121 | 1 | 0 | 0 | 0 | 0 | 0 |
| 122 | 1 | 0 | 0 | 0 | 0 | 0 |
| 123 | 1 | 0 | 0 | 0 | 0 | 0 |
| 124 | 0 | 0 | 0 | 0 | 0 | 0 |
| 125 | 0 | 0 | 0 | 0 | 0 | 0 |
| 126 | 0 | 0 | 0 | 0 | 0 | 0 |
| 127 | 0 | 0 | 0 | 0 | 0 | 0 |
| 128 | 0 | 0 | 0 | 0 | 0 | 0 |
| 129 | 3 | 0 | 0 | 0 | 0 | 0 |
| 130 | 0 | 0 | 0 | 0 | 0 | 0 |
| 131 | 0 | 0 | 0 | 0 | 0 | 0 |
| 132 | 0 | 0 | 0 | 0 | 0 | 0 |
| 133 | 0 | 0 | 0 | 0 | 0 | 0 |
| 134 | 0 | 0 | 0 | 0 | 0 | 0 |
| 135 | 0 | 0 | 0 | 0 | 0 | 0 |
| 136 | 0 | 0 | 0 | 0 | 0 | 0 |
| 137 | 0 | 0 | 0 | 0 | 0 | 0 |
| 138 | 0 | 0 | 0 | 0 | 0 | 0 |
| 139 | 0 | 0 | 0 | 0 | 0 | 0 |
| 140 | 0 | 0 | 0 | 0 | 0 | 0 |
| 141 | 0 | 0 | 0 | 0 | 0 | 0 |
| 142 | 0 | 0 | 0 | 0 | 0 | 0 |
| 143 | 0 | 0 | 0 | 0 | 0 | 0 |
| 144 | 0 | 0 | 0 | 0 | 0 | 0 |
| 145 | 0 | 0 | 0 | 0 | 0 | 0 |
| 146 | 0 | 0 | 0 | 0 | 0 | 0 |
| 147 | 0 | 0 | 0 | 0 | 0 | 0 |

FIG.13D

Confidential

| Delta pix. | P_6 | P_7 | P_8 | P_9 | P_10 | P_11 |
|---|---|---|---|---|---|---|
| 148 | 0 | 0 | 0 | 0 | 0 | 0 |
| 149 | 0 | 0 | 0 | 0 | 0 | 0 |
| 150 | 0 | 0 | 0 | 0 | 0 | 0 |
| 151 | 0 | 0 | 0 | 0 | 0 | 0 |
| 152 | 0 | 0 | 0 | 0 | 0 | 0 |
| 153 | 0 | 0 | 0 | 0 | 0 | 0 |
| 154 | 0 | 0 | 0 | 0 | 0 | 0 |
| 155 | 0 | 0 | 0 | 0 | 0 | 0 |
| 156 | 0 | 0 | 0 | 0 | 0 | 0 |
| 157 | 0 | 0 | 0 | 0 | 0 | 0 |
| 158 | 0 | 0 | 0 | 0 | 0 | 0 |
| 159 | 0 | 0 | 0 | 0 | 0 | 0 |
| 160 | 0 | 0 | 0 | 0 | 0 | 0 |
| 161 | 0 | 0 | 0 | 0 | 0 | 0 |
| 162 | 0 | 0 | 0 | 0 | 0 | 0 |
| 163 | 0 | 0 | 0 | 0 | 0 | 0 |
| 164 | 0 | 0 | 0 | 0 | 0 | 0 |
| 165 | 0 | 0 | 0 | 0 | 0 | 0 |
| 166 | 0 | 0 | 0 | 0 | 0 | 0 |
| 167 | 0 | 0 | 0 | 0 | 0 | 0 |
| 168 | 0 | 0 | 0 | 0 | 0 | 0 |
| 169 | 0 | 0 | 0 | 0 | 0 | 0 |
| 170 | 0 | 0 | 0 | 0 | 0 | 0 |
| 171 | 0 | 0 | 0 | 0 | 0 | 0 |
| 172 | 0 | 0 | 0 | 0 | 0 | 0 |
| 173 | 0 | 0 | 0 | 0 | 0 | 0 |
| 174 | 0 | 0 | 0 | 0 | 0 | 0 |
| 175 | 0 | 0 | 0 | 0 | 0 | 0 |
| 176 | 0 | 0 | 0 | 0 | 0 | 0 |
| 177 | 0 | 0 | 0 | 0 | 0 | 0 |
| 178 | 0 | 0 | 0 | 0 | 0 | 0 |
| 179 | 0 | 0 | 0 | 0 | 0 | 0 |
| 180 | 0 | 0 | 0 | 0 | 0 | 0 |
| 181 | 0 | 0 | 0 | 0 | 0 | 0 |
| 182 | 0 | 0 | 0 | 0 | 0 | 0 |
| 183 | 0 | 0 | 0 | 0 | 0 | 0 |
| 184 | 0 | 0 | 0 | 0 | 0 | 0 |

FIG.13E

Confidential

| Delta pix. | P_6 | P_7 | P_8 | P_9 | P_10 | P_11 |
|---|---|---|---|---|---|---|
| 185 | 0 | 0 | 0 | 0 | 0 | 0 |
| 186 | 0 | 0 | 0 | 0 | 0 | 0 |
| 187 | 0 | 0 | 0 | 0 | 0 | 0 |
| 188 | 0 | 0 | 0 | 0 | 0 | 0 |
| 189 | 0 | 0 | 0 | 0 | 0 | 0 |
| 190 | 0 | 0 | 0 | 0 | 0 | 0 |
| 191 | 0 | 0 | 0 | 0 | 0 | 0 |
| 192 | 0 | 0 | 0 | 0 | 0 | 0 |
| 193 | 0 | 0 | 0 | 0 | 0 | 0 |
| 194 | 0 | 0 | 0 | 0 | 0 | 0 |
| 195 | 0 | 0 | 0 | 0 | 0 | 0 |
| 196 | 0 | 0 | 0 | 0 | 0 | 0 |
| 197 | 0 | 0 | 0 | 0 | 0 | 0 |
| 198 | 0 | 0 | 0 | 0 | 0 | 0 |
| 199 | 0 | 0 | 0 | 0 | 0 | 0 |
| 200 | 0 | 0 | 0 | 0 | 0 | 0 |
| 201 | 0 | 0 | 0 | 0 | 0 | 0 |
| 202 | 0 | 0 | 0 | 0 | 0 | 0 |
| 203 | 0 | 0 | 0 | 0 | 0 | 0 |
| 204 | 0 | 0 | 0 | 0 | 0 | 0 |
| 205 | 0 | 0 | 0 | 0 | 0 | 0 |
| 206 | 0 | 0 | 0 | 0 | 0 | 0 |
| 207 | 0 | 0 | 0 | 0 | 0 | 0 |
| 208 | 0 | 0 | 0 | 0 | 0 | 0 |
| 209 | 0 | 0 | 0 | 0 | 0 | 0 |
| 210 | 0 | 0 | 0 | 0 | 0 | 0 |
| 211 | 0 | 0 | 0 | 0 | 0 | 0 |
| 212 | 0 | 0 | 0 | 0 | 0 | 0 |
| 213 | 0 | 0 | 0 | 0 | 0 | 0 |
| 214 | 0 | 0 | 0 | 0 | 0 | 0 |
| 215 | 0 | 0 | 0 | 0 | 0 | 0 |
| 216 | 0 | 0 | 0 | 0 | 0 | 0 |
| 217 | 0 | 0 | 0 | 0 | 0 | 0 |
| 218 | 0 | 0 | 0 | 0 | 0 | 0 |
| 219 | 0 | 0 | 0 | 0 | 0 | 0 |
| 220 | 0 | 0 | 0 | 0 | 0 | 0 |
| 221 | 0 | 0 | 0 | 0 | 0 | 0 |

FIG.13F

Confidential

| Delta pix. | P_6 | P_7 | P_8 | P_9 | P_10 | P_11 |
|---|---|---|---|---|---|---|
| 222 | 0 | 0 | 0 | 0 | 0 | 0 |
| 223 | 0 | 0 | 0 | 0 | 0 | 0 |
| 224 | 0 | 0 | 0 | 0 | 0 | 0 |
| 225 | 0 | 0 | 0 | 0 | 0 | 0 |
| 226 | 0 | 0 | 0 | 0 | 0 | 0 |
| 227 | 0 | 0 | 0 | 0 | 0 | 0 |
| 228 | 0 | 0 | 0 | 0 | 0 | 0 |
| 229 | 0 | 0 | 0 | 0 | 0 | 0 |
| 230 | 0 | 0 | 0 | 0 | 0 | 0 |
| 231 | 0 | 0 | 0 | 0 | 0 | 0 |
| 232 | 0 | 0 | 0 | 0 | 0 | 0 |
| 233 | 0 | 0 | 0 | 0 | 0 | 0 |
| 234 | 0 | 0 | 0 | 0 | 0 | 0 |
| 235 | 0 | 0 | 0 | 0 | 0 | 0 |
| 236 | 0 | 0 | 0 | 0 | 0 | 0 |
| 237 | 0 | 0 | 0 | 0 | 0 | 0 |
| 238 | 0 | 0 | 0 | 0 | 0 | 0 |
| 239 | 0 | 0 | 0 | 0 | 0 | 0 |
| 240 | 0 | 0 | 0 | 0 | 0 | 0 |
| 241 | 0 | 0 | 0 | 0 | 0 | 0 |
| 242 | 0 | 0 | 0 | 0 | 0 | 0 |
| 243 | 0 | 0 | 0 | 0 | 0 | 0 |
| 244 | 0 | 0 | 0 | 0 | 0 | 0 |
| 245 | 0 | 0 | 0 | 0 | 0 | 0 |
| 246 | 0 | 0 | 0 | 0 | 0 | 0 |
| 247 | 0 | 0 | 0 | 0 | 0 | 0 |
| 248 | 0 | 0 | 0 | 0 | 0 | 0 |
| 249 | 0 | 0 | 0 | 0 | 0 | 0 |
| 250 | 0 | 0 | 0 | 0 | 0 | 0 |
| 251 | 0 | 0 | 0 | 0 | 0 | 0 |
| 252 | 0 | 0 | 0 | 0 | 0 | 0 |
| 253 | 0 | 0 | 0 | 0 | 0 | 0 |
| 254 | 0 | 0 | 0 | 0 | 0 | 0 |
| 255 | 0 | 0 | 0 | 0 | 0 | 0 |

FIG.13G

IMAGE p1:                                   PTiffInfo.txt
    Entropy Score                           758
    Max Pixel Value                         55
    Min Pixel Value                         14

IMAGE p2:
    Entropy Score                           776
    Max Pixel Value                         73
    Min Pixel Value                         18

IMAGE p3:
    Entropy Score                           806
    Max Pixel Value                         97
    Min Pixel Value                         22

IMAGE p4:
    Entropy Score                           852
    Max Pixel Value                         112
    Min Pixel Value                         24

IMAGE p5:
    Entropy Score                           880
    Max Pixel Value                         133
    Min Pixel Value                         27

IMAGE p6:
    Entropy Score                           894
    Max Pixel Value                         152
    Min Pixel Value                         30

FIG.14

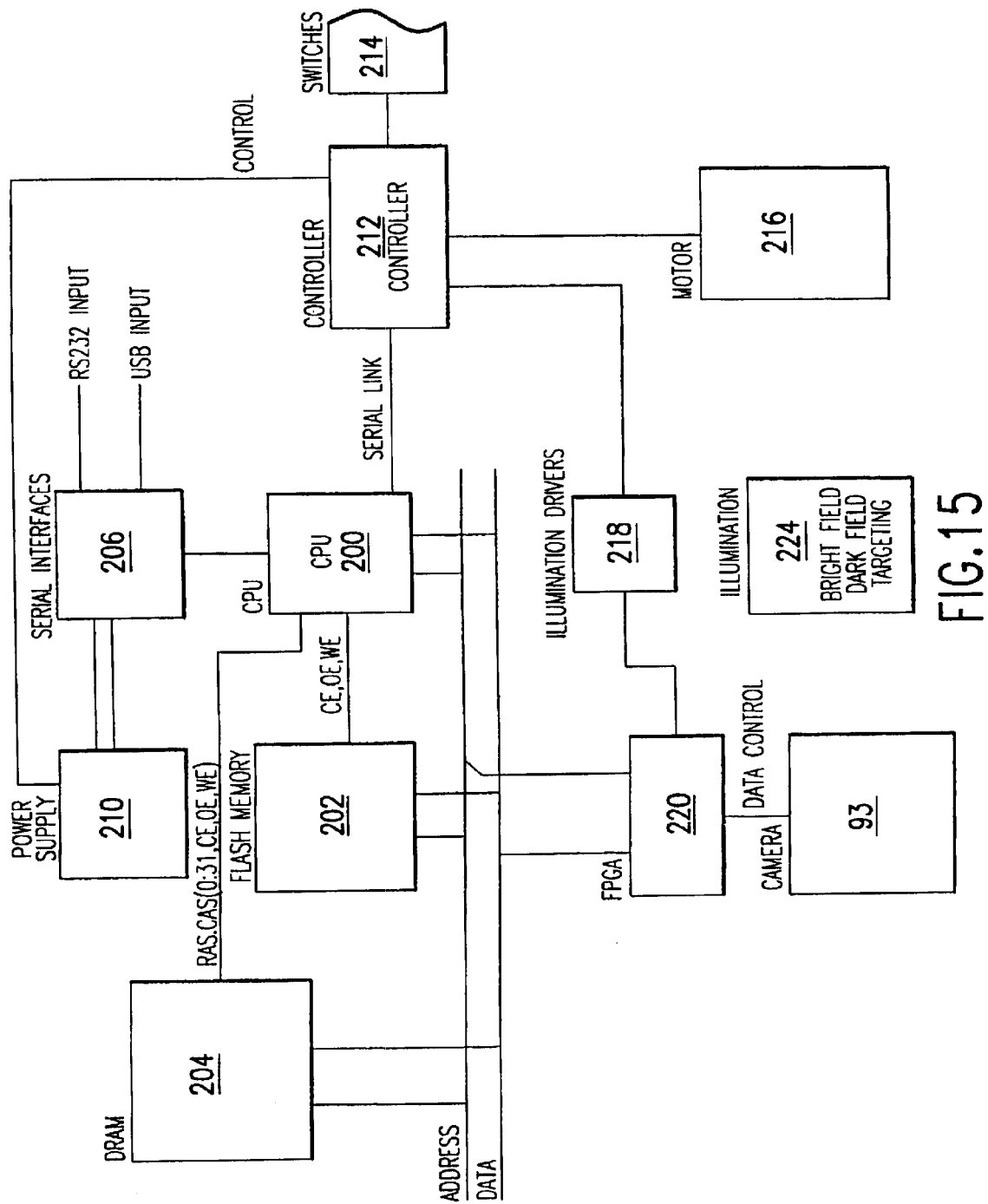

OPTICAL SYMBOLOGIES IMAGER

CROSS REFERENCE TO RELATED APPLICATIONS

This application is related to copending U.S. patent application Ser. No. 09/151,766 (Symbology Imager System and Reading Apparatus and Method) and U.S. application Ser. No. 09/151,765 (Diffused Surface Illumination Apparatus and Method) the entire disclosures of which are incorporated herein by reference. Further, International Application Serial No. WO 97/42756 filed on May 6, 1996, for a Smart Progressive-Scan Charge Coupled Device Camera, and which was filed by CIMatrix, one of the co-applicant's of the present application is also incorporated herein by reference.

BACKGROUND OF THE INVENTION

1. Field of the Invention

The present invention relates to an imager for reading optical symbologies such as traditional bar codes and 2D symbologies. More particularly, the present invention relates to a hand-held optical code imager which quickly and easily adjusts illumination and focus and has an preferred operating range of approximately 1.5 to 16 inches, however, the imager may have an operating range with both lower and higher limits, and still fall within the intended scope of the present application.

2. Description of the Prior Art

The use of bar codes has proliferated to the point where they are used in almost every industry to provide machine readable information about an item or product and to help track such items. Numerous different symbologies have been developed, such as one dimensional linear codes and 2D codes, such as Data Matrix. Typical linear codes comprise a series of parallel lines of varying thickness and spacing which are arranged in a linear configuration to represent a digital code containing information relating to the object. The use of bar codes has expanded due to the fact that the imaging and tracking process eliminates human error and can be performed quickly.

The amount of information a bar code can contain is dependent upon the size of the markings employed in the bar code, which determines the density of the code. Linear bar codes such as UPC codes, are only recorded in one dimension. On the other hand, 2D symbologies are encoded in two dimensions to contain greater information density.

In a typical reading process, a spot of light from a laser is projected and swept across the code, and the reflected light is sensed by a photosensitive element. In conventional imagers, lasers are used as the source illumination. Scanners may be either installed in a fixed location or portable hand-held units.

Hand-held scanners must be designed to operate in situations where the number of varying factors is greater than for fixed scanners. For instance, the distance between the scanner and the bar code, the amount of illumination, the focusing of the scanner, the orientation of the scanner relative to the bar code, and the angle of the scanner relative to the bar code are all factors which must be considered for the scanner to operate correctly. For instance, U.S. Pat. No. 5,296,690 to Chandler et al. discloses a system for locating and determining the orientation of bar codes in a two-dimensional image. The Chandler et al. patent is primarily concerned with making sure that the scan of the bar code is performed correctly with regard to the orientation of the scanner and the bar code.

Some hand-held scanning devices have a wand-like configuration where the device is intended to make contact with the code as it is swept across the code. Such a wand eliminates the variation in the distance between the scanner and the code and therefore requires no focusing.

Two-dimensional arrays such as charge coupled device (CCD) arrays have been used to create the image of the bar code as it is scanned, but traditionally a laser and a single photodiode are used for scanning a linear bar code. A CCD having dimensions of 640 by 480 pixels provides sufficient resolution for use with VGA monitors, and is widely accepted. The video image is sensed in the CCD, which generates an analog signal representing the variation in intensity of the image, and an analog to digital converter puts the image signal into digital form for subsequent decoding. Two dimensional sensors are used with spatially oriented 2D codes.

For a non-contact hand-held scanner, it is necessary to be able to read the bar code over a reasonable distance, to provide sufficient illumination, to focus the scanner onto the bar code and perform the entire operation in a reasonable amount of time. While it may be possible to create an imager which can perform all of the desired functions, if the imager does not operate in a manner the user finds comfortable and sufficient, then the imager will not be accepted by end users and will not be commercially viable. For example, if the imager cannot perform the focusing quickly enough, then variations in the position of the scanner, due to the inability of the user to hold the imager steady, will create problems which cannot be easily overcome.

By way of example, if a scanner takes too long to perform a focusing function from the moment the user depresses a trigger, then the position of the scanner relative to the bar code may vary during the focusing operation thereby requiring yet another focusing operation. Similarly, such movement in the position of the scanner relative to the bar code will change the parameters for achieving the desired illumination.

Scanners which have been designed to read linear, or one dimensional, codes are, for the most part, incapable of scanning 2D symbologies. Linear and 2D symbologies may be provided on items by attaching a label to the item, putting the item in a container having a preprinted code, or by directly marking the product, such as by etching. Most conventional scanners may find it difficult to read symbologies which have been etched directly onto a product.

SUMMARY OF THE INVENTION

These and other deficiencies of the prior art are addressed by the present invention which is directed to a hand-held imager which is capable of reading both linear one dimensional codes and two dimensional symbologies, which can perform illuminating and focusing steps quickly and accurately so as to eliminate variation in the position of the imager relative to the code, and which can operate in an environment where the imager is preferably positioned anywhere from substantially 1.5 inches to 16 inches from the targeted code.

The hand-held imager of the present invention can perform omnidirectional coded symbology reading for both linear and two-dimensional symbologies over relatively long working distances. The imager includes an imaging system having a focusing system, an illumination system, and a two-dimensional photodetector which forms an image of the bar code. After achieving targeting of the coded symbology, the reader of the present invention adjusts illumination and then the focus between multiple different focuses, and utilizes a portion of the two-dimensional photodetector to determine the optimum focus. Upon the determination of optimum focus, the focusing system is configured at the optimum focusing configuration established in the initial focusing step, and an image is created using the entire two-dimensional photodetector.

A targeting system visually assists the user to position the reader so that the coded symbology, being targeted, is within the field of view of the reader. The reader has two types of illumination, one for symbologies which are close to the reader, and a second type of illumination for symbologies which are farther from the reader. The two-dimensional photodetector may be employed to determine the optimum illumination.

It is an object of the present invention to provide a hand-held reading device capable of reading both linear and 2D coded symbology.

Another object of the present invention is to provide a hand-held reader which can perform an imaging operation in a range between 1.5 inches and 16 inches to the coded symbology for typical hand-held use, but may have both higher and lower distance limits.

Yet another object of the present invention is to provide a hand-held reader capable of reading direct product markings in addition to coded symbology printed on labels.

Still another object of the present invention is to provide a hand-held reader which utilizes a two dimensional sensor to facilitate focusing and illumination adjustment.

Yet another object of the present invention is to provide a hand-held reader which utilizes a two dimensional sensor to facilitate focusing and illumination adjustment, where only a small portion of information received by the two dimensional sensor is used, to thereby speed processing.

Another object of the present invention is to provide a hand-held reader made from commonly available "off-the-shelf" components.

BRIEF DESCRIPTION OF THE DRAWINGS

The foregoing and other attributes and objects of the present invention will be described with respect to the following drawings in which:

FIGS. 6a–6k are represent eleven images p1–p11, where images p1–p6, shown in FIGS. 6a–6f, are used in the photonics or photometric analysis, and images p6–p11, shown in FIGS. 6f–6k, are used in the focus analysis;

FIGS. 8a–8k show Table A, containing data from which the pixel plots of FIG. 7 are derived;

FIGS. 10a–10g show Table B which contains the population for each peak-to-peak value of each image p1–p6, and illustrated in FIG. 9;

FIG. 11 is a table showing the entropy score, maximum pixel value and minimum pixel value for each image p1–p6;

FIGS. 12a and 12b are frequency histograms for images p6–p11, shown in FIGS. 6f–6k, with FIG. 12b being an enlargement of a portion of FIG. 12a;

FIGS. 13a–13g show Table C which contains the delta peak value of each image p6–p11;

FIG. 14 is a chart showing the entropy score, maximum pixel value and minimum pixel value for each image p6–p11; and FIG. 15 is a block diagram of the imager according to the present invention.

DETAILED DESCRIPTION OF THE INVENTION

Figure 1:
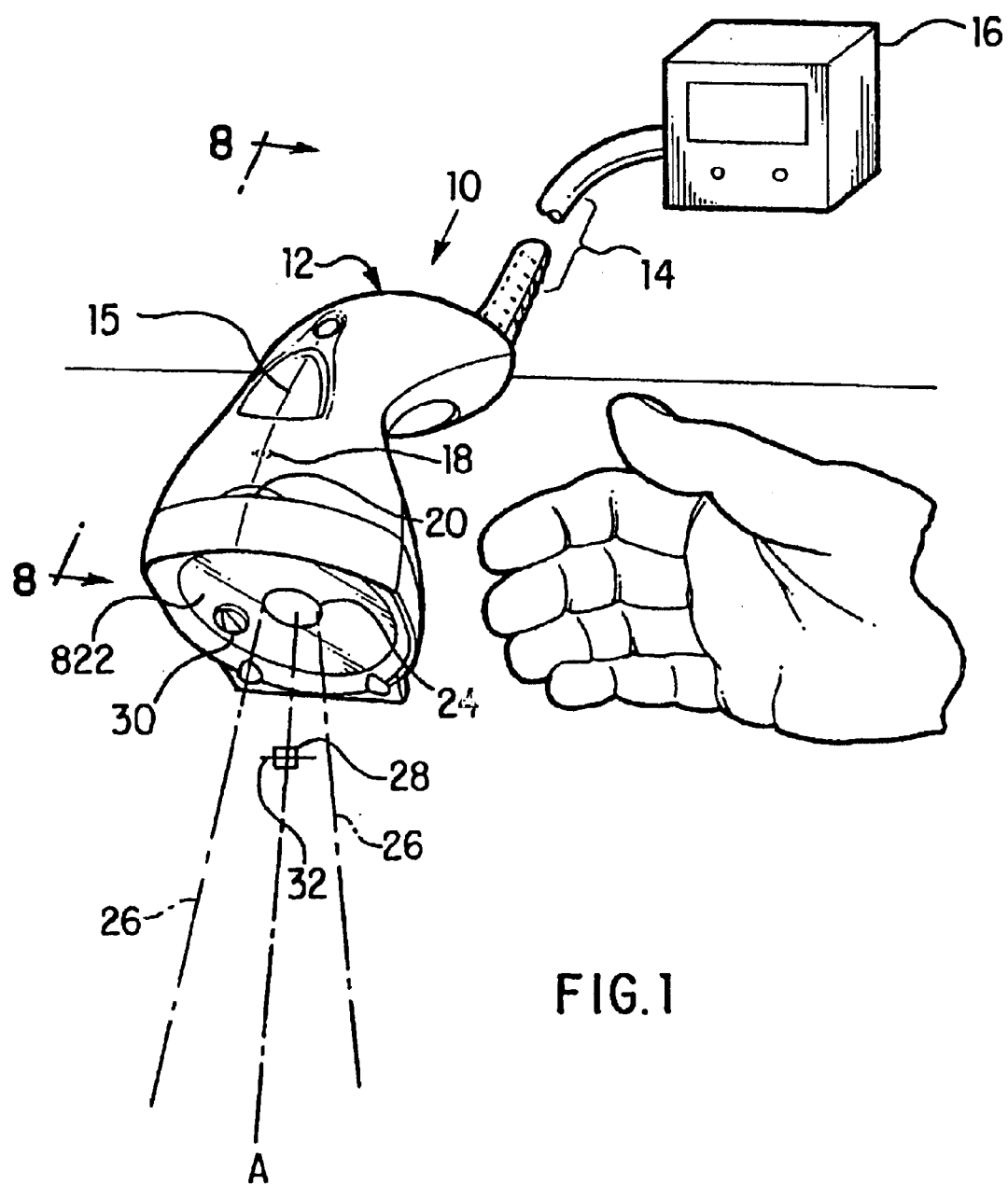
FIG. 1 is a perspective view of the reader according to the present invention.
Figure 2:
FIG. 2 is a plan view of a typical linear type coded symbology.
Figure 3:
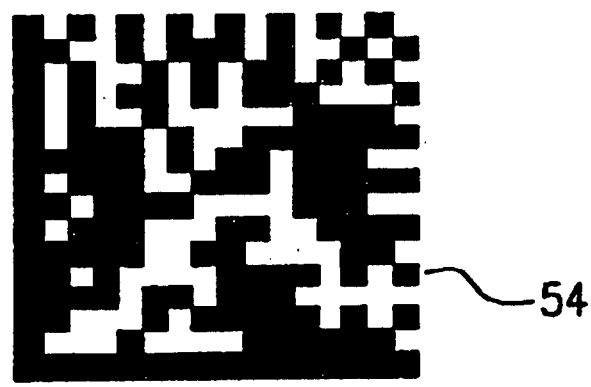
FIG. 3 is a plan view of a Data Matrix symbology.

The hand-held reader 10 shown in FIG. 1 is capable of reading coded symbologies omnidirectionally, and producing decoded data. The scanning device 10 is self-sufficient and does not require an external power source, except for host power provided through an interface cable 14. The scanner 10 can read both linear bar codes 40, as shown in FIG. 2, and matrix or 2D coded symbologies 54 as shown in FIG. 3.

The linear or 2D coded symbologies are standard symbologies well known in the art, and the decoding of them is similarly well known. However, unlike conventional scanners, the reader 10 of the present invention can read both types of symbologies, can operate over a wide range of distances, 1.5 to 16 inches, and is held-held. To achieve these results, the reader 10, upon activation by the user, must be able to target the coded symbology, determine the optimum illumination, determine the optimum focus, and make an image of the targeted coded symbology in an extremely short period of time in order to eliminate possible degrading variations.

For example as the user holds the reader 10 relative to a linear bar code 40 or a 2D coded symbology 54, the reader can move relative to the code thereby changing the focus, illumination and angle of the scanner relative to the code. By performing the entire image capture function as quickly as possible, from the moment targeting is achieved, such variables are minimized. How such rapid image focusing, illumination and capture are performed will be described in detail below.

The reader 10 includes an ergonomic housing 12 designed to fit comfortably in a user's hand. The reader 10 decodes the data, and forwards the decoded data to a computing device platform, such as a PDT, PLC or PC, which performs information gathering as one of its functions. A switch or trigger 15 protrudes through the top of the housing 12 for activation by the user's finger. Lights 18 and 20 are provided on the top of the housing 12 and indicate the active status and successful imaging of the coded symbology, respectively. Audible signals may also be provided.

The hand-held imager 10 utilizes an aiming device to locate the target symbologies in the field of view (FOV). The method of targeting is designed to minimize power consumption. A programmable two-phase trigger is used to acquire the target symbology.

A window 22 having a clear aperture section 24 is provided on the front of the housing 12. A targeting line 32 is produced by a light source in the hand-held imager 10 and is projected onto the targeted coded symbology to ensure that the coded symbology 40 or 54 is within the field of view of the imager 10. The targeting line 32 is preferably a color, such as red, which is discernable from the ambient light sources.

In operation, the user presses the trigger 15 to a first position thereby causing the projection of the targeting line 32 onto the coded symbology. The targeting line 32 is then used to position the imager 10 and the coded symbology relative to one another. The imager 10 then adjusts the illuminating light if necessary, and determines the correct focus. The light 18 is illuminated to indicate to the user that imaging is underway. Upon completion of the imaging process the light 20 turns on to provide the user with an indication of successful scanning.

Referring to FIGS. 2 and 3, a linear code 40 and Data Matrix code 54, respectively, are shown. Typical 2D or Data Matrix symbologies are smaller than linear codes and may be directed onto the product. The information is typically encoded in feature sizes of 5, 7.5, or 10 mils. As a result, the imager 10 needs to be much closer when reading 2D symbologies 54 than for linear codes 40.

Figure 4:
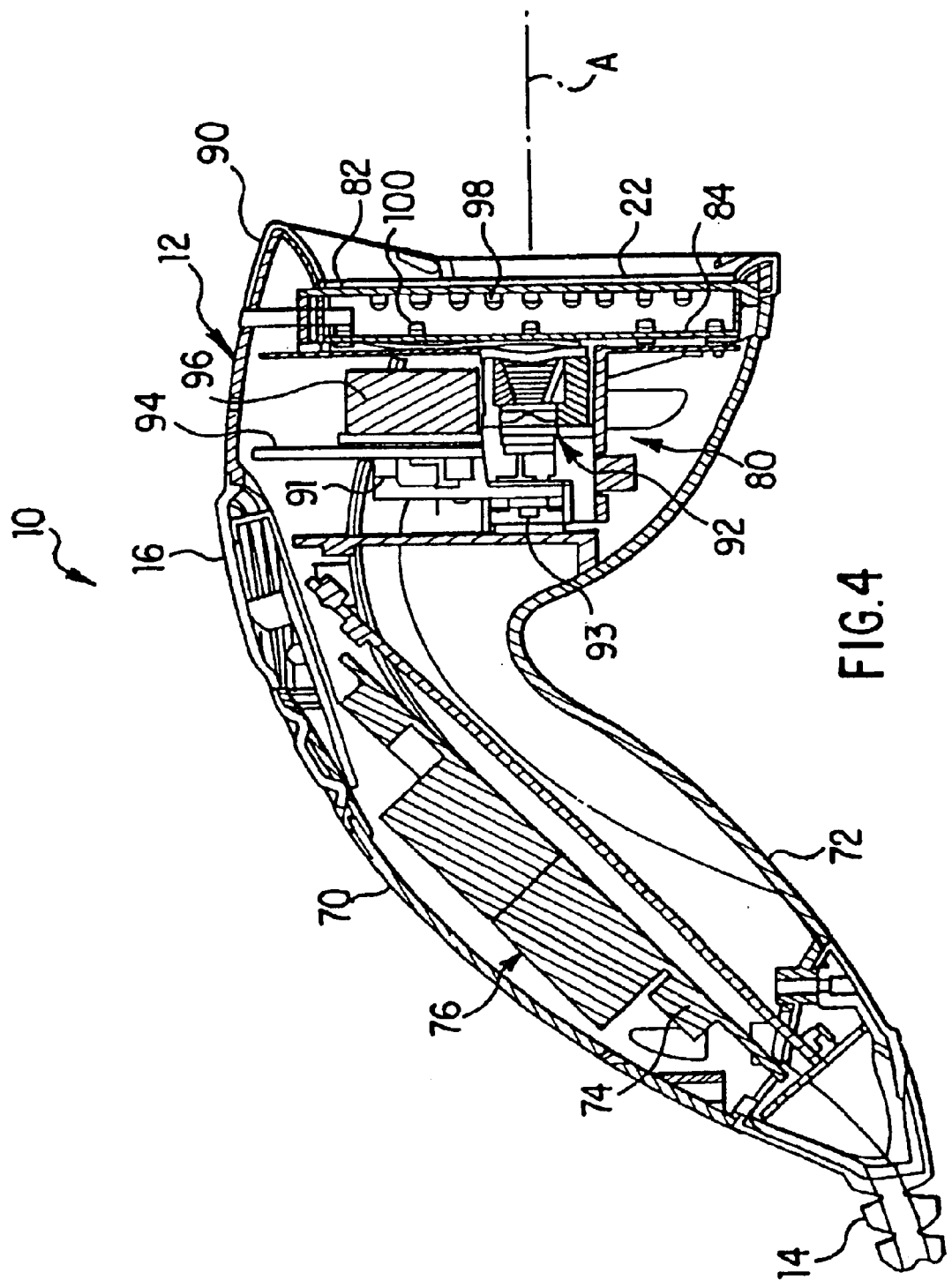
FIG. 4 is a cross-sectional view of the reader shown in FIG. 1 according to the present invention.

The imager 10 is shown in cross-section in FIG. 4, where the optical system 80 is illustrated as including objective taking lens 92 and focusing disk 94. The disk is driven rotational at 600 RPM about axis 91 by the motor 96. The rotational axis 91 is offset from the optical axis $O_A$ of the imaging system 80. A dark field illuminator 82 having multiple light emitting elements 98, such as LEDs, which illuminate rearwardly onto a non-transparent wall, which then provides diffuse light to the window 22. A bright field illuminator 84 is provided with multiple light emitting elements 100 for radiating forward directly through the window 22. Dark field illumination is provided for direct product marking (low contrast), while bright field illumination is used primarily for high contrast label marks.

Built-in bright field and dark field illumination are provided to achieve proper contrast for reading the symbologies on direct product marked parts at close-in distances. Only bright field illumination is used at greater working distances. The details of the illumination system are set forth in co-pending commonly owned patent application Ser. No. 09/151,765 filed on Sep. 11, 1998.

A key aspect of the present invention is the CCD detector 93, positioned along the optical axis $O_A$. The CCD detector 93 is rectangular and has a VGA pixel density. In the preferred embodiment, the CCD detector 93 is an interline 659×494 progressive scan, monochromatic CCD, which may be manufactured by Panasonic Corporation, model #MN37761AE, or a 659×494 pixel CCD manufactured by Sony Corporation, model #ICX084AL. Both of the foregoing CCD's provide 640×480 resolution commonly used in VGA monitors. While the preferred embodiment illustrated herein utilizes a CCD, other array detectors such as CMOS, or other sensors may be used. Furthermore, the CCD need not be limited to 640 by 480 and may have other sizes.

The hand-held imager 10 can decode multiple symbologies on any background, including etched metal and printed ink jet. The paramount reading capability for use on surfaces that are direct product marked is the Data Matrix symbology.

Figure 5A:
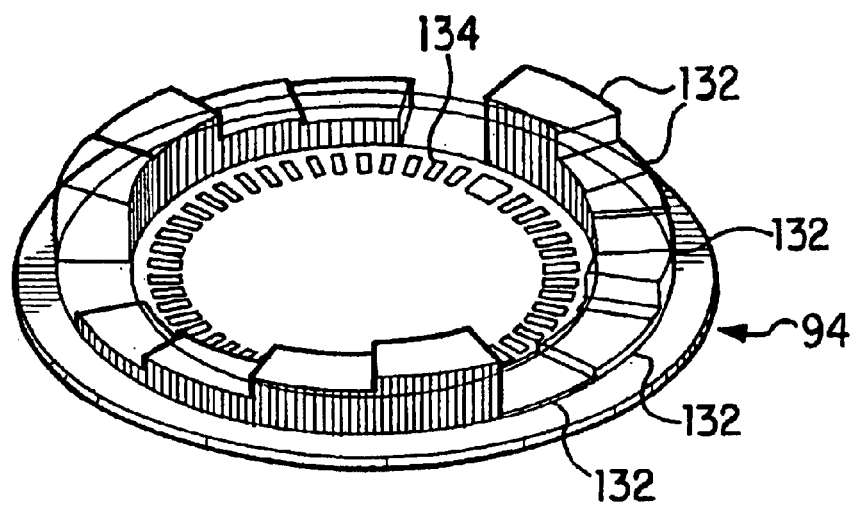
FIG. 5a is a perspective view of a first embodiment of a focusing disk which may be employed in the focusing system of the present invention.

A first embodiment of the focusing disk 94, shown in cross-section in FIG. 4, is shown in greater detail in FIG. 5a. The disk 94 has a series of different thickness optical positions 132. The thickness of the optical positions 132 is varied to focus the objective lens 92 onto the CCD detector 93 during image capture. The illustrated embodiment shows twelve optical positions 132 which thereby provide twelve potential focus ranges. A positional encoding strip 134 is provided on the disk 94 so that the position of the disk can be tracked. However, it is noted that the invention could operate with at least two optical positions.

Figure 5B:
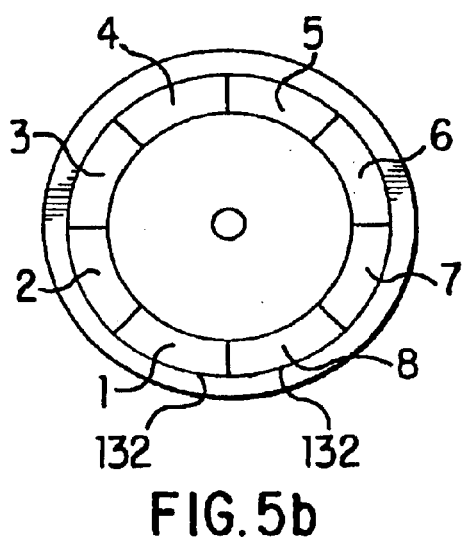
FIGS. 5b and 5c are planar and cross-sectional views, respectively, of a second embodiment of a focusing disk which may be employed in the focusing system of the present invention.
Figure 5C:
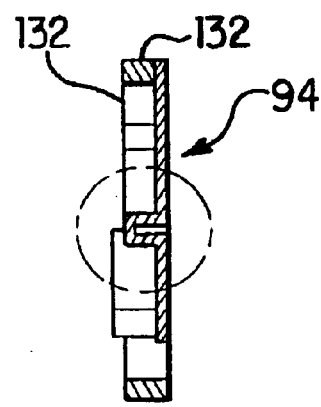

Referring to FIGS. 5b and 5c, planar and cross-sectional views of a second embodiment of the focusing disk 94 is shown. The second embodiment has eight optical positions 132 and further includes an outer circumferential wall 136 which provides additional structural support.

The CCD detector 93 is utilized to determine which optical plate 132, and therefore which focusing zone, is appropriate for a particular coded symbology scan. As the disk 94 is rotated, the illuminating light is reflected back through the objective lens 92 through each of the optical positions 132 and onto the CCD detector 93. In order to minimize the time it takes to focus the imager 10, only a fraction of the pixels of the CCD detector 93 are employed in the determination of the optimum optical plate, and thereby the focused optical plate.

From start up, the imager 10 produces target illumination, then takes approximately 25 to 30 milliseconds to reach the rotational speed of 600 RPM. The CCD then powers up and then resets. Multiple, up to five, images are taken for photometry, and multiple images are taken for focusing. Each image requires exposure time and shift out time, which is in the range of, but no greater than 5.5 mS. After the optimum optical plate is repositioned in the optical path the CCD detector must capture and shift out the entire image in about 31.4 milliseconds. The total time for the entire operation is therefore less than half a second, which is sufficient to minimize the variable factors discussed previously.

The aforementioned variations are more detrimental to photometry than to focus analysis. In order to minimize the variations, the present invention employs a number of techniques to accelerate the operation. First, the imager operates in a "fast mode." A small size slice of an image, 384 by 10, is utilized, 384 being over 60% of the image width, and 10 scan lines is more than two times the minimum cell size requirement (4 pixels). This ensures than a transition will be encountered in the image slice, while having as small a size a feasible. The search for the proper exposure time uses seven images, but the use of only five images is contemplated, which will require no more than 30 mS. The optical disk 94 can be separated into two groups of optical positions 132, for Dark field and Bright Field images.

The maximum time to decode a printed label is 350 milliseconds, while the maximum time to decode a direct product marked code is 400 milliseconds. The foregoing times include the time, from the trigger is activated, to illuminate, focus, acquire the image, decode the symbology, and output the decoded data.

If all 325,546 pixels of the CCD detector 93 were used for each optical plate 132 of the focusing disk 94, the image capture procedure would take far too long. To minimize the time required to obtain data for each optical plate 132, only a portion of the CCD detector 93 is used. In operation, the CCD detector 93 generates image data as 494 lines, one line at a time, each line being 659 pixels long. The first 246 lines, instead of being digitized which would require significant time, are "dumped." Furthermore, to accelerate the process, the speed at which the data is sent through the CCD is much faster than the speed used for normal image capture. Since the information contained in the first 246 lines is not important to the focusing steps, the degradation of such information, due to the accelerated reception, is not a detriment.

The next ten lines, lines 247–256 are utilized in the analysis described below, and then the CCD detector 93 is reset, never reading lines 257–494. In this manner, the focusing time is more than halved.

Referring to FIG. 15, a block diagram of the imager 10 of the present invention is illustrated. The CPU 200 connects to the flash memory 202 and DRAM 204, which together form the computing engine for the imager 10. The CPU 200 further connects to the serial interfaces 206, which in turn is connected to the power supply 210. A microcontroller 212 is connected by serial link to the CPU 200, and in turn is connected to the power supply 210, switches 214, motor 216 and illumination drivers 218. The Illumination drivers 218 are connected to the Bright Field and Dark Field and Targeting Illumination, shown as Illumination 224 in FIG. 15. An FPGA 220 is connected to the CPU 200, the flash memory 202, DRAM 204, illumination drivers 218 and CCD 222. The FPGA 220 controls the CCD and the Illumination 224. The FPGA 220 and microcontroller 212 control the targeting. The Motor 216 drives the focusing disk 94.

In order to evaluate the image data for each optical plate 132, the ten middle lines of data need to be analyzed. The transitions between light and dark areas of the code are critical for such analysis. Furthermore, it is important to note that in the determination of which optical plate provides the best focus and illumination, the quality of the images relative to one another is what is important, not the absolute image quality. The imager 10 is designed to achieve correct decoding of the coded symbology targeted with the minimum necessary focusing, not perfect focusing which would require considerably more time and/or complexity.

As an example we will traverse a scan line from left to right. For the examples in FIGS. 7–14 we used a minimum peak to peak value of 12. This means that a relative white pixel must be greater than a relative black pixel by a magnitude of 12 for it to be considered a white pixel relative to that black pixel, but other values may be used depending on the application. We will first look for a local minimum. We choose a new minimum when the current pixel is less than the previous minimum. We stop looking for a minimum and start looking for a maximum when we find a pixel with a value greater than or equal to the minimum pixel plus 12. We then continue looking for a maximum until we find a pixel that is less than or equal to the current maximum minus 12. When this occurs we have a local minimum, a local maximum, the magnitude of the difference and the number of pixels between the minimum and maximum points. The magnitude of the difference or peak to peak value is used as the index to the bin number of the edge histogram that should be incremented by one. The number of pixels between the peaks is used as the index to the bin number of the frequency histogram that should be incremented by one. This sequence is repeated for the remainder of the scan line.

Figure 7:
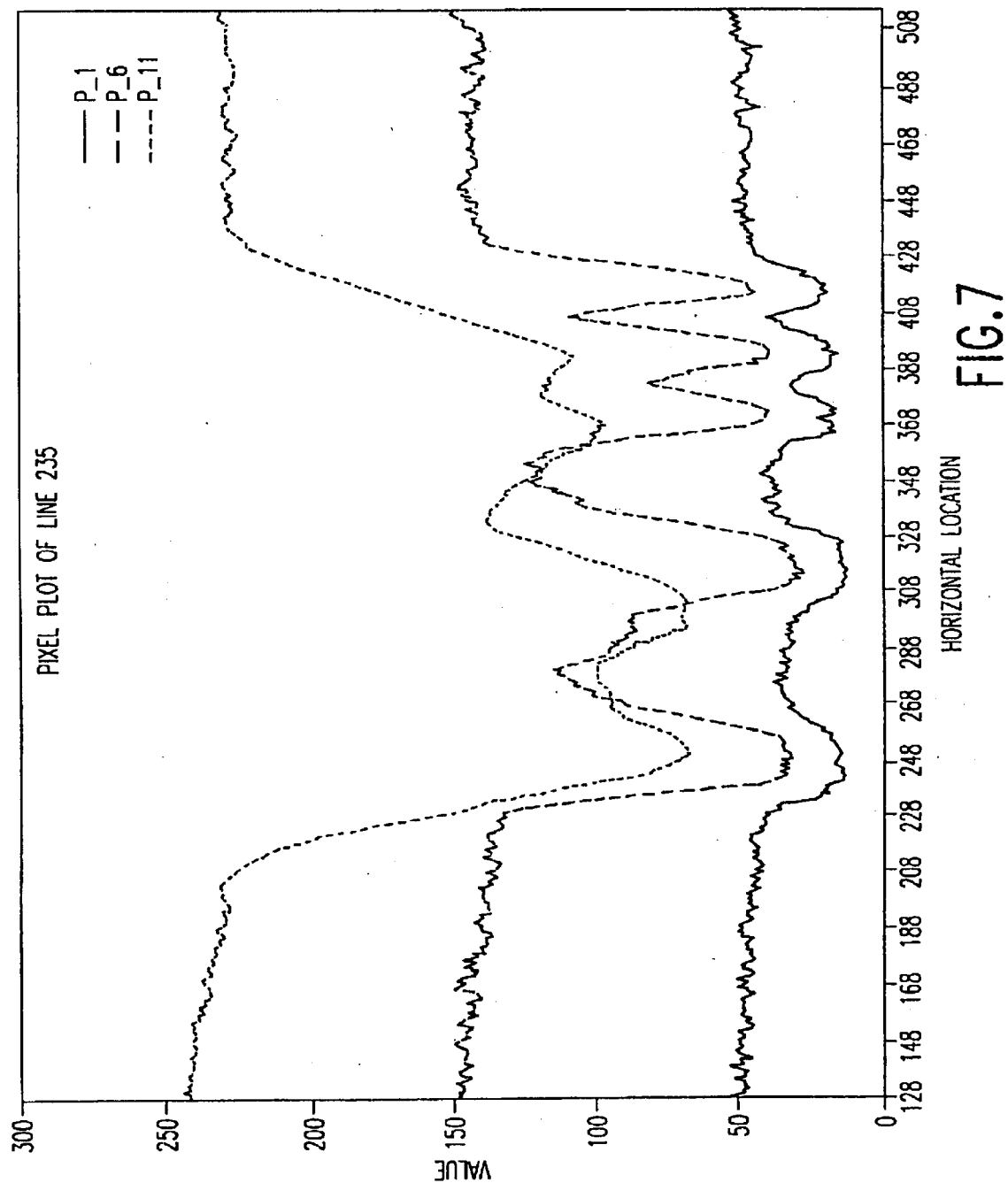
FIG. 7 shows a pixel plot of line 235 of a CCD for the values between 128 and 508, in the horizontal location, for images p1, p6, and p11, shown in FIGS. 6a, 6f and 6k.
Figure 7A:
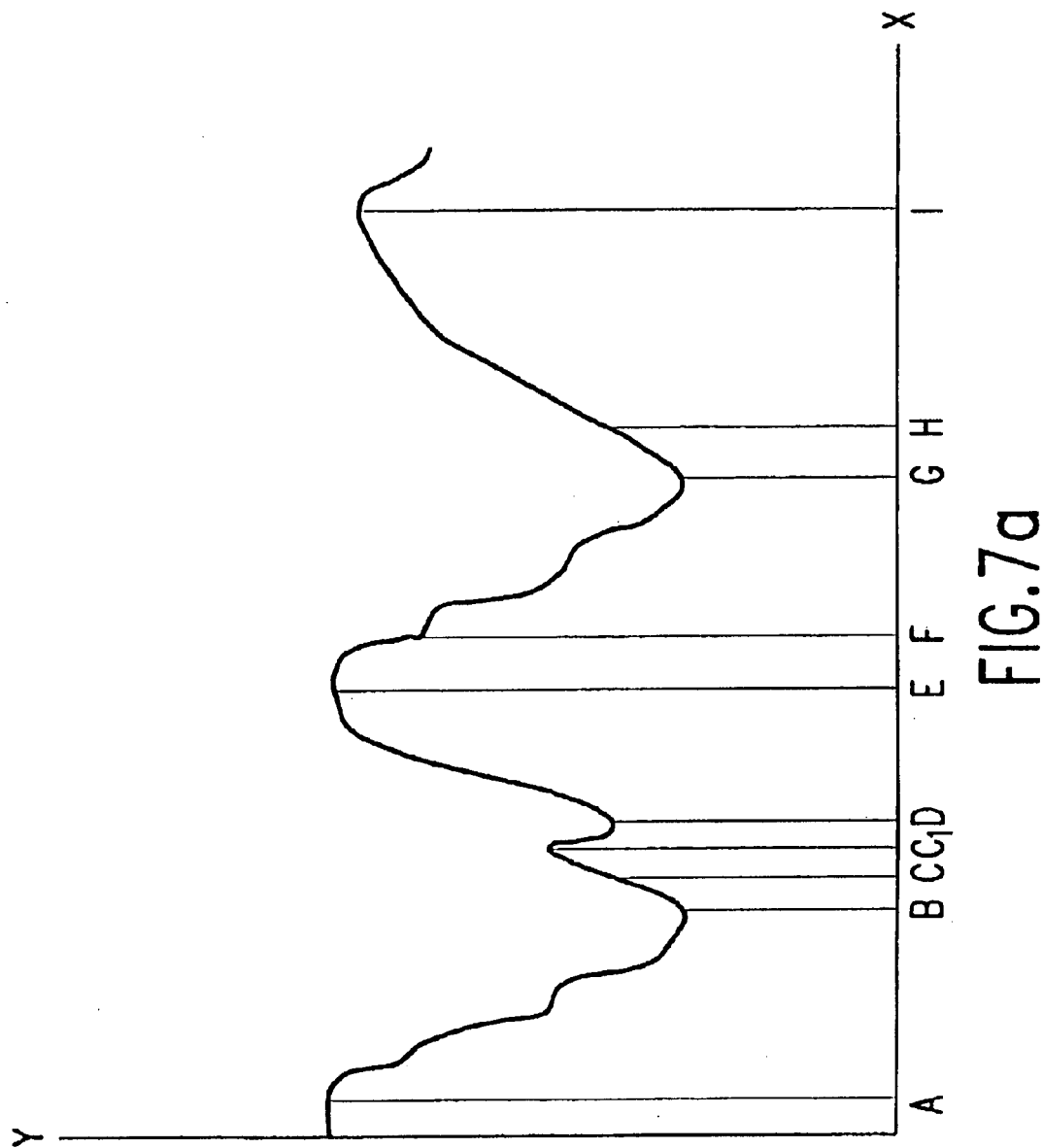
FIG. 7a is a graph showing local maxima and minima points.

Referring to FIG. 7a, point A is the first local maxima. Point B is the first local minima. Point C is an inflection recognition point, meaning you know you are done looking for a local minima because you are more than 12 above the value at point B. You can then evaluate the pair AB. For the pair AB, the frequency corresponds to $|X(A)-X(B)|$, while the peak to peak value corresponds to $|Y(A)-Y(B)|$. Point D is not a local minima because it is not at least 12 less than point C1, an inflection point between points B and D. Point E is the second local maxima, pont F is the inflection recognition point for the pair BE. Point G is the second local minima and point H is the third inflection recognition point corresponding to the pair EG. Point I is the third local maxima.

Figure 6A:
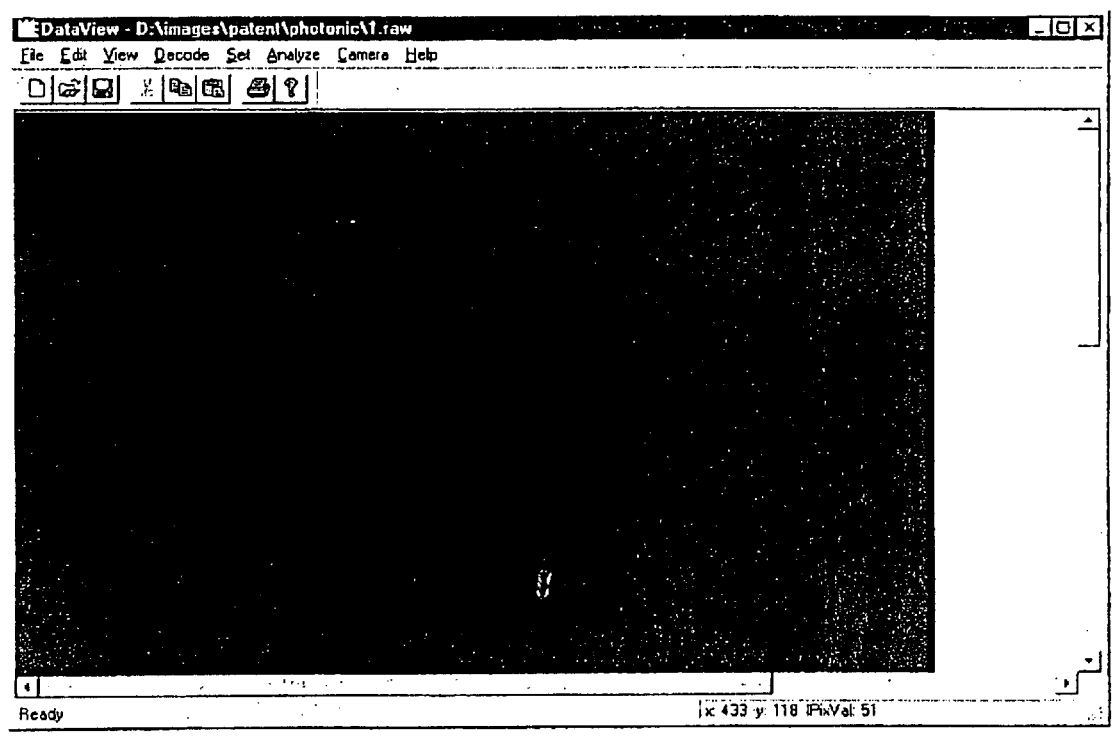
Figure 6B:
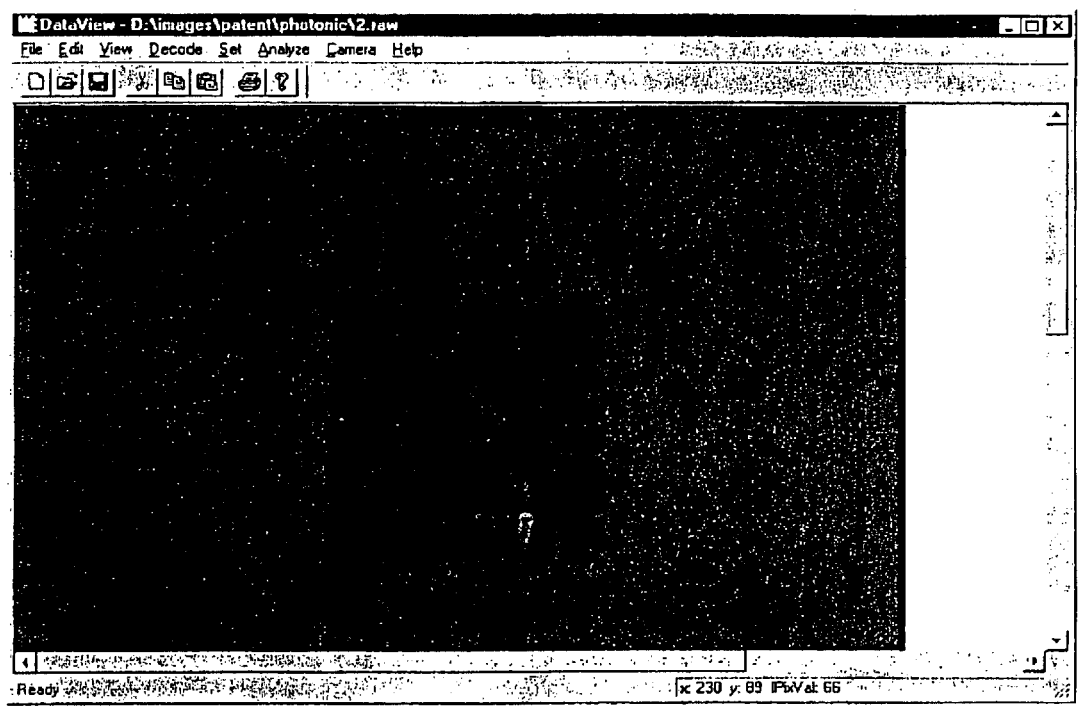
Figure 6C:
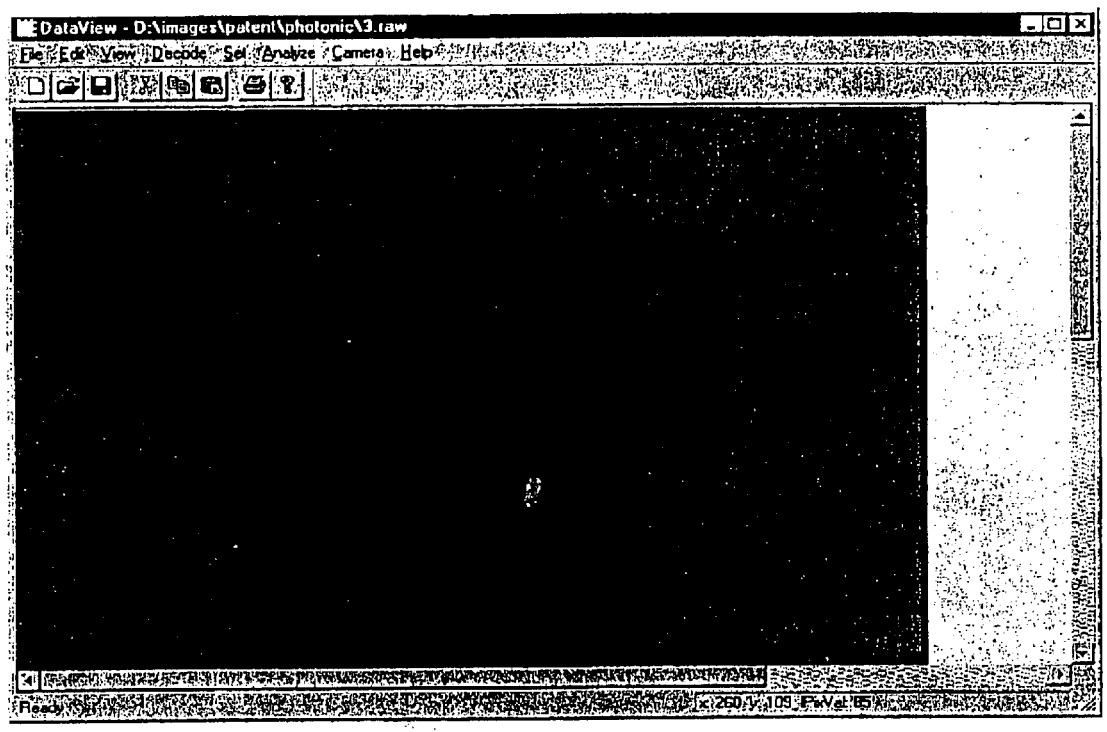
Figure 6D:
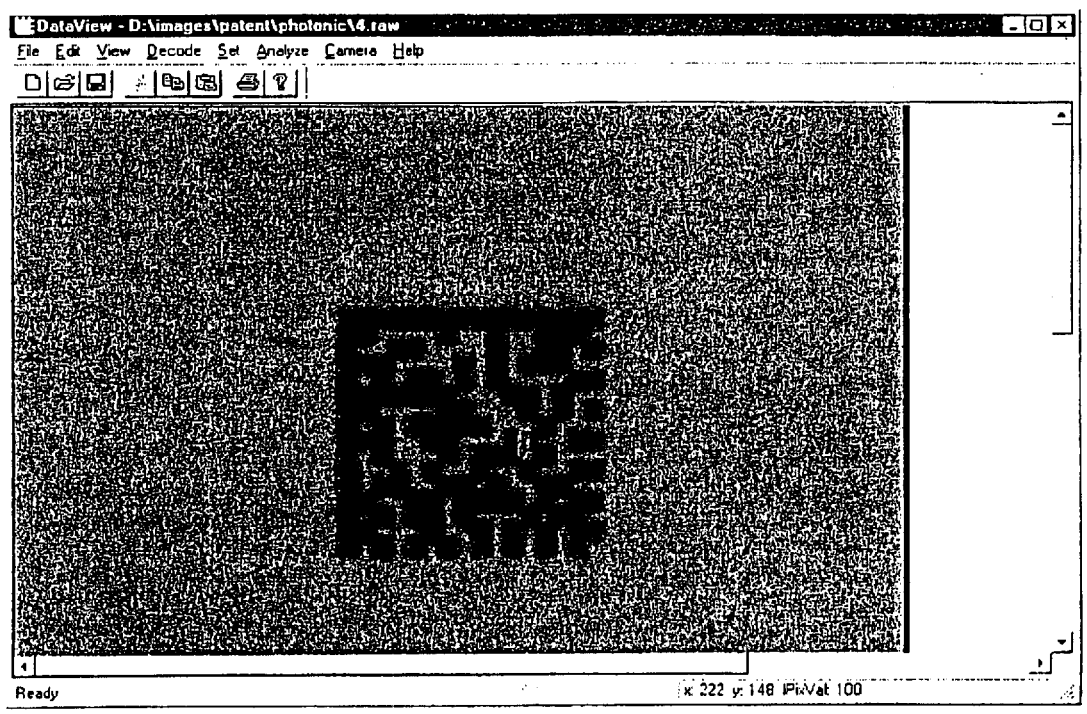
Figure 6E:
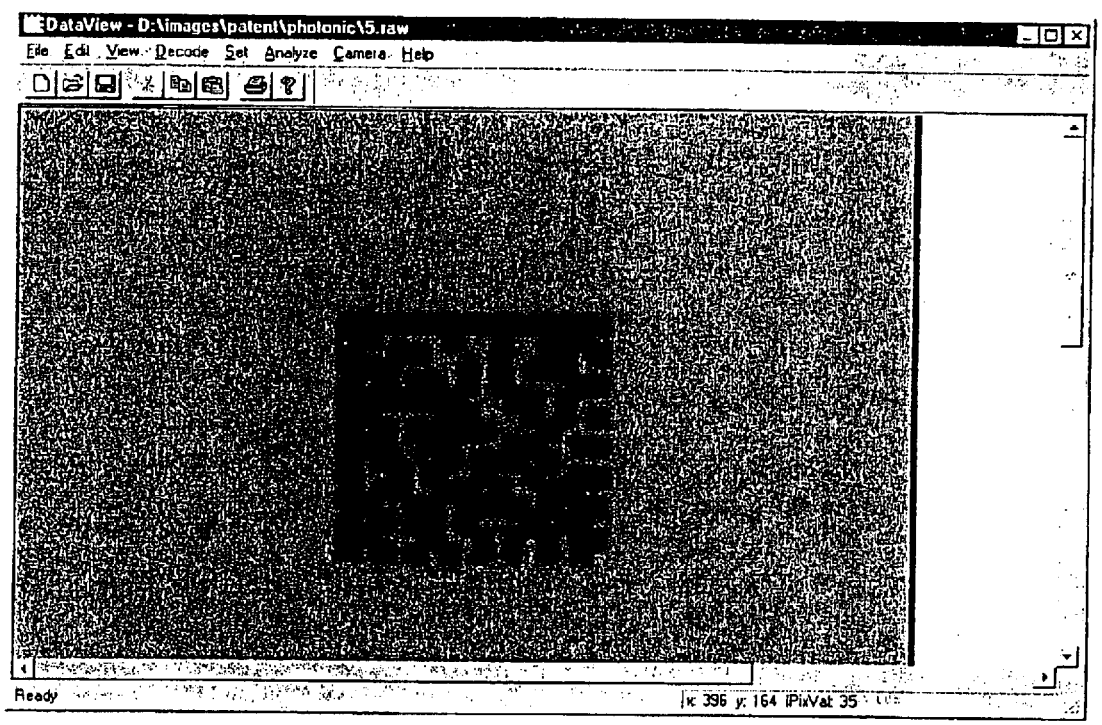
Figure 6F:
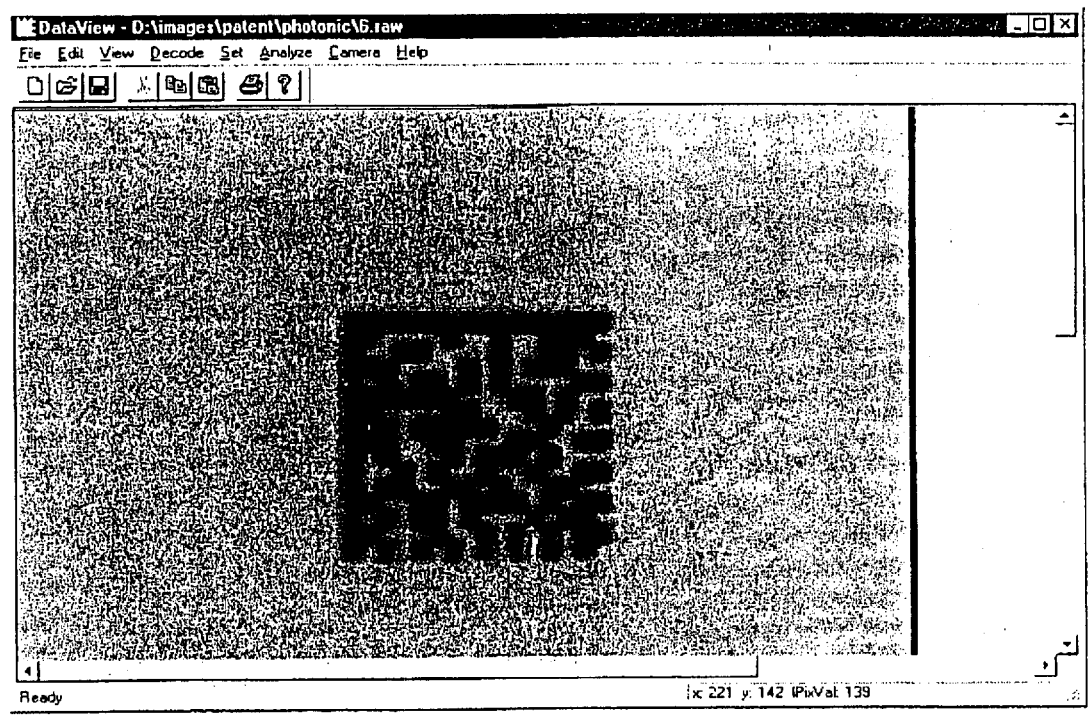
Figure 6G:
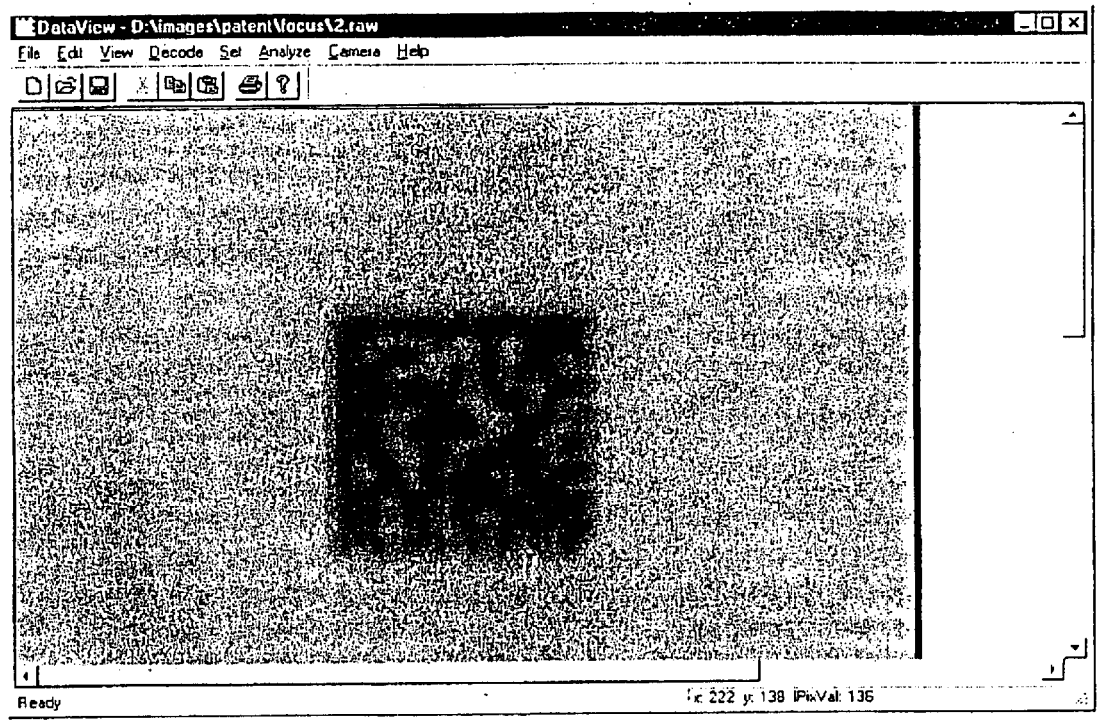
Figure 6H:
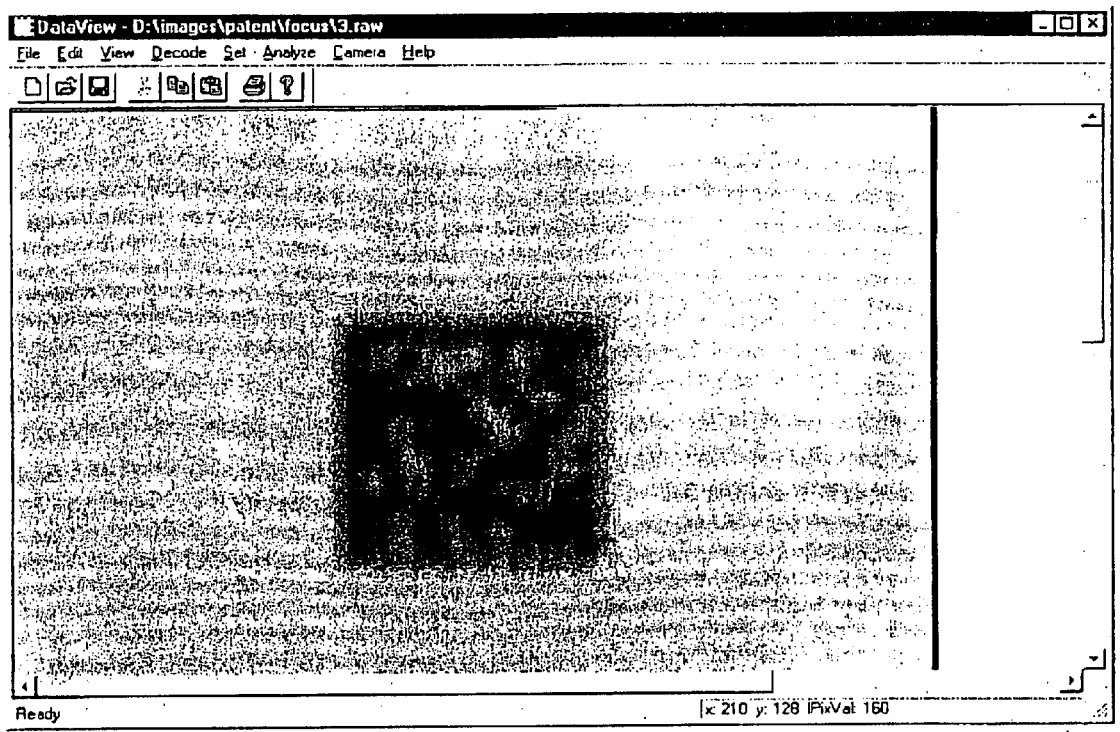
Figure 61:
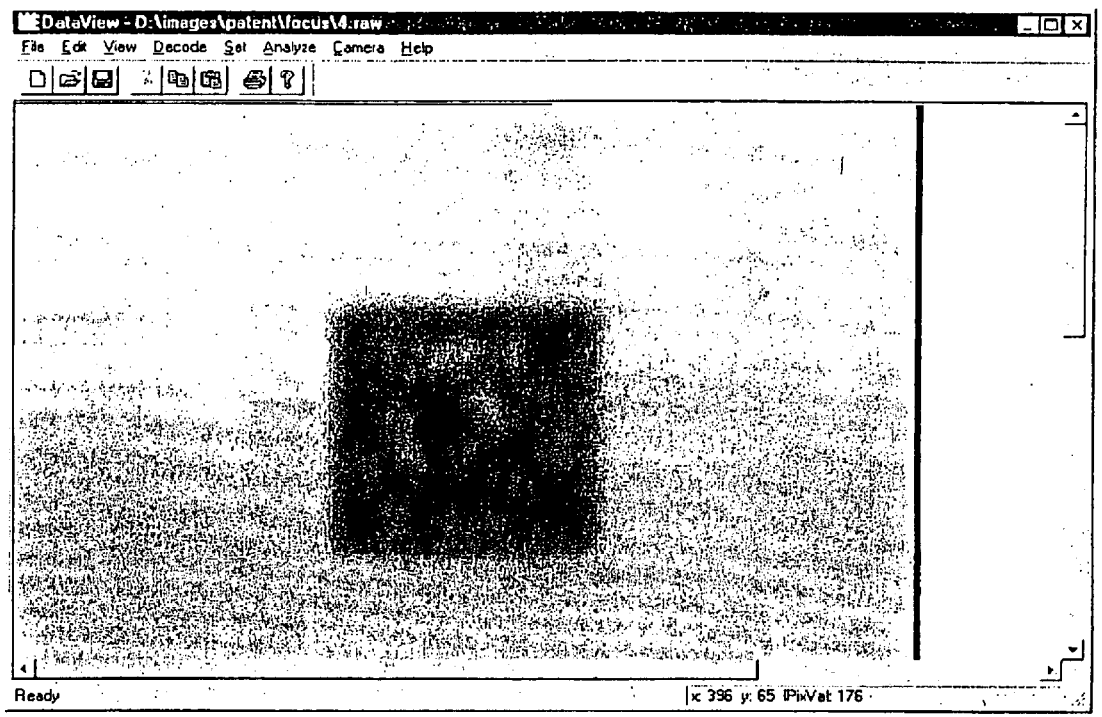
Figure 6J:
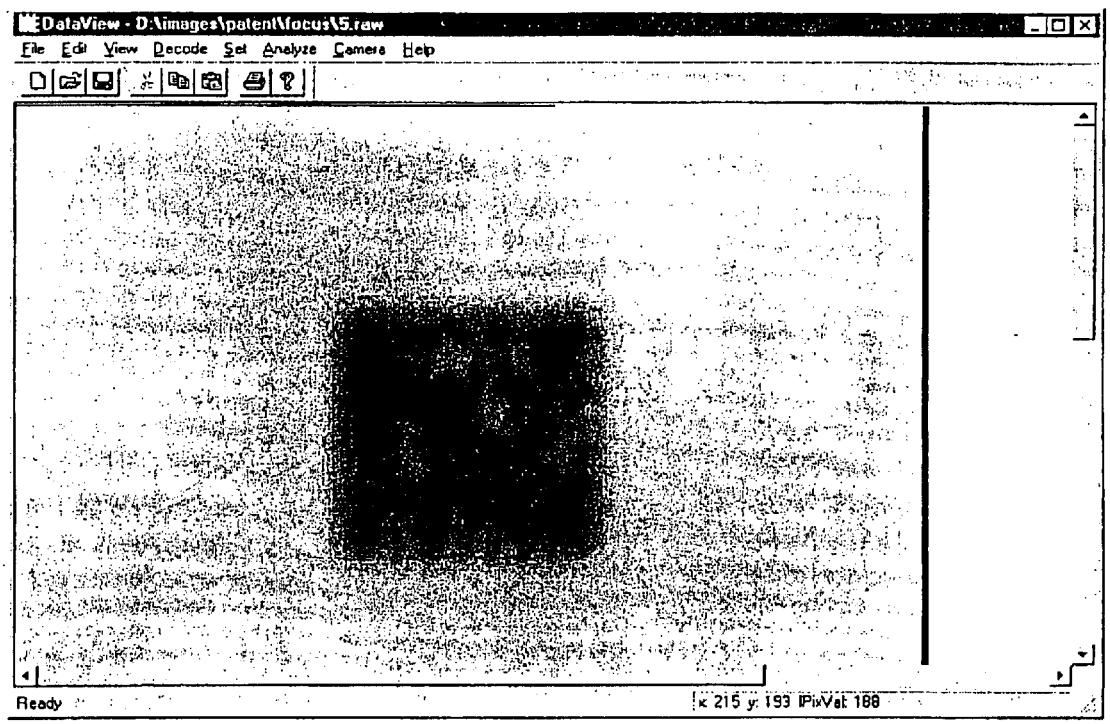
Figure 6K:
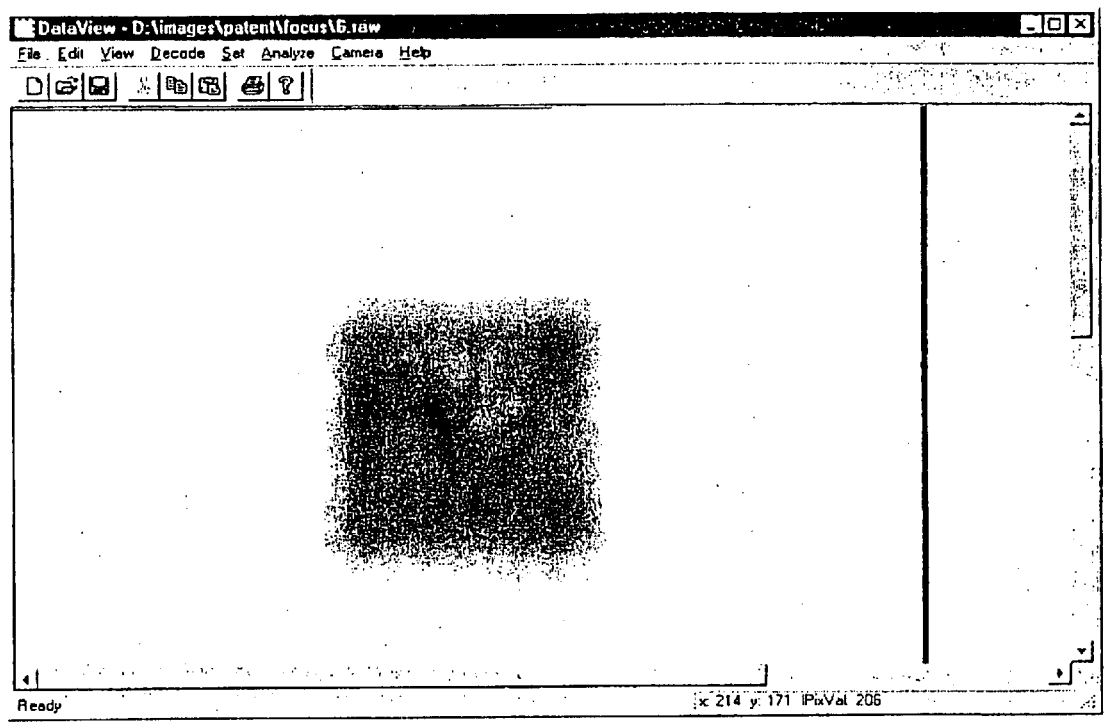

For illustrative purposes, FIG. 7 shows a pixel plot of line 235 of the CCD for the values between 128 and 508, in the horizontal location, for images p1, p6, and p1, shown in FIGS. 6a, 6f and 6k. The three images are shown by three different lines, p1 is shown by the solid line, image p6 is shown by the dashed line, and image p11 is shown by the dotted line.

The data from which the pixel plots of FIG. 7 are drawn as shown in Table A, shown in FIGS. 8a–8k, and includes the values for each horizontal location within the field. From FIG. 7, it can be clearly seen that the image p6 has the best transitions.

Illumination analysis is performed by developing entropy scores for each illuminating condition. The quality or nature of the transitions (peak-to-peak) values are taken into account by this analysis. In an edge histogram the y axis is the population or number of transitions, and the x axis represents the peak-to-peak value. FIGS. 6a–6k represent eleven images p1–p11. Images p1–p6, shown in FIGS. 6a–6f, are used in the following photonics or photometric analysis, and images p6–p11, shown in FIGS. 6f–6k, are used in the following focus analysis.

Figure 9:
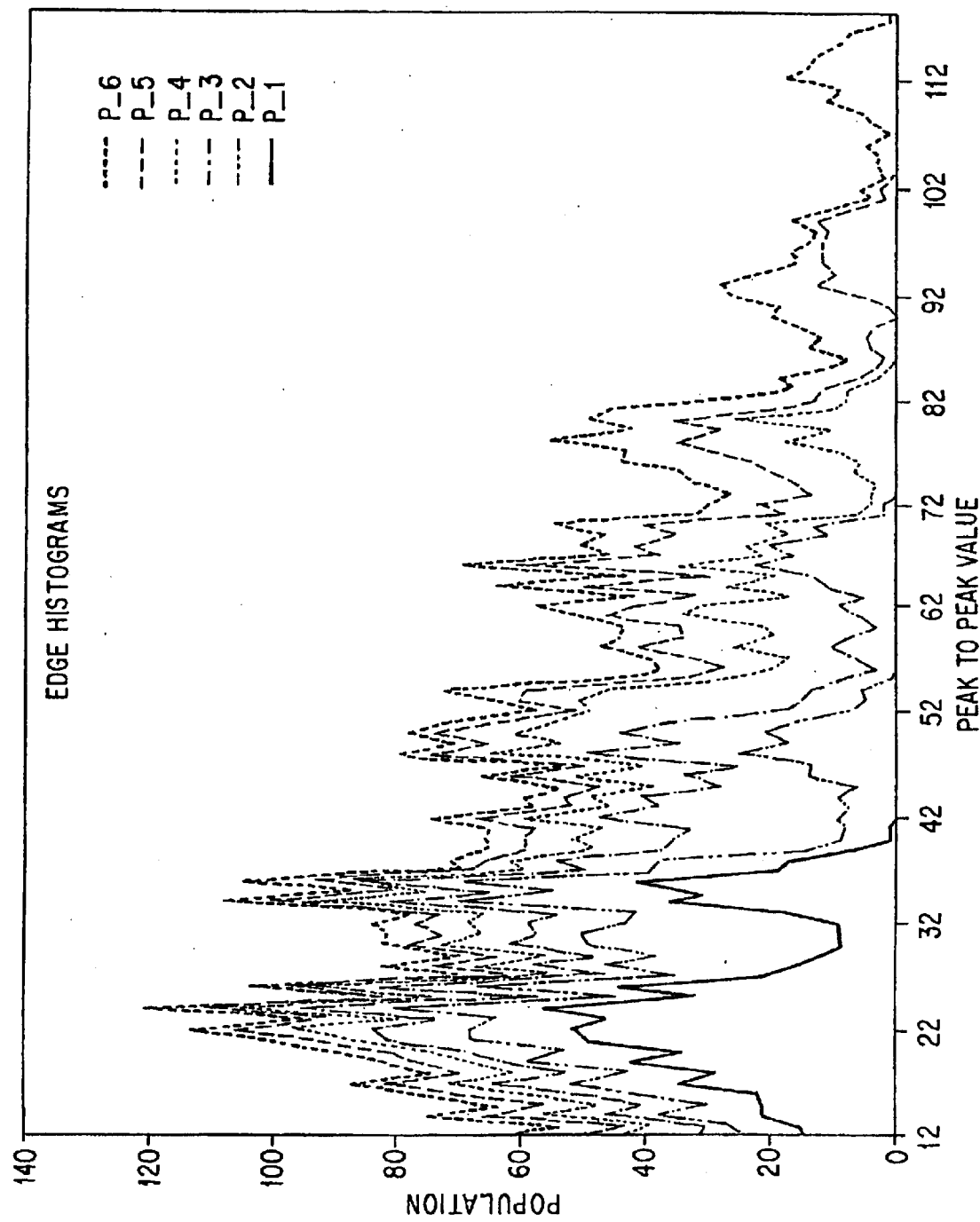
FIG. 9 is an edge histogram for images p1–p6, shown in FIGS. 6a–6f.

Referring to FIG. 9, an edge histogram is illustrated for images p1–p6, shown in FIGS. 6a–6f. FIGS. 10a–10e show Table B which contains the population for each peak-to-peak value of each image p1–p6. The images p1–p6 are illustrated by different shaded areas in FIG. 9. The peak-to-peak values begin at 12, since, as shown in FIG. 10a, the first population value does not occur until 12 for image p1. Similarly, FIG. 9 ends with value 118 for image p6. The remaining values up to 255 are all zeros in the example shown in FIG. 9, and therefore are not illustrated. The entropy score, maximum pixel value and minimum pixel value for each image p1–p6 are shown in FIG. 11, with the entropy score being the total of the population values for each image. The entropy values individually have no meaning. Rather, a comparison of the entropy values with one another shows which image has the highest entropy value. Here it is image p6 with a value of 758. With reference to FIG. 9, it is clear that image p6 has the largest area under its curve, which is represented by the entropy value. From the forgoing, it can be seen that image p6 has the best illumination.

The maximum and minimum pixel values are obtained from the average of the brightest 20 and the average of the dimmest 20 values, respectively. These maximum and minimum pixel values can be used to determine if the image meets minimum criteria for usability.

The entropy score is not used by itself, and in particular when an image is over-saturated. In that instance, the signal has reduced the peak-to-peak values, and has fewer edges than an under-saturated image.

To perform the optical plate focus analysis the microprocessor concerns itself with the rate of change of energy between neighboring pixels of image data. If all transitions are plotted in a two dimensional histogram, a graph can be generated to produce a score for determining the optimum focus. The x axis represents the number of pixels between local maxima and minima, and the y axis represents the population.

Figure 12B:
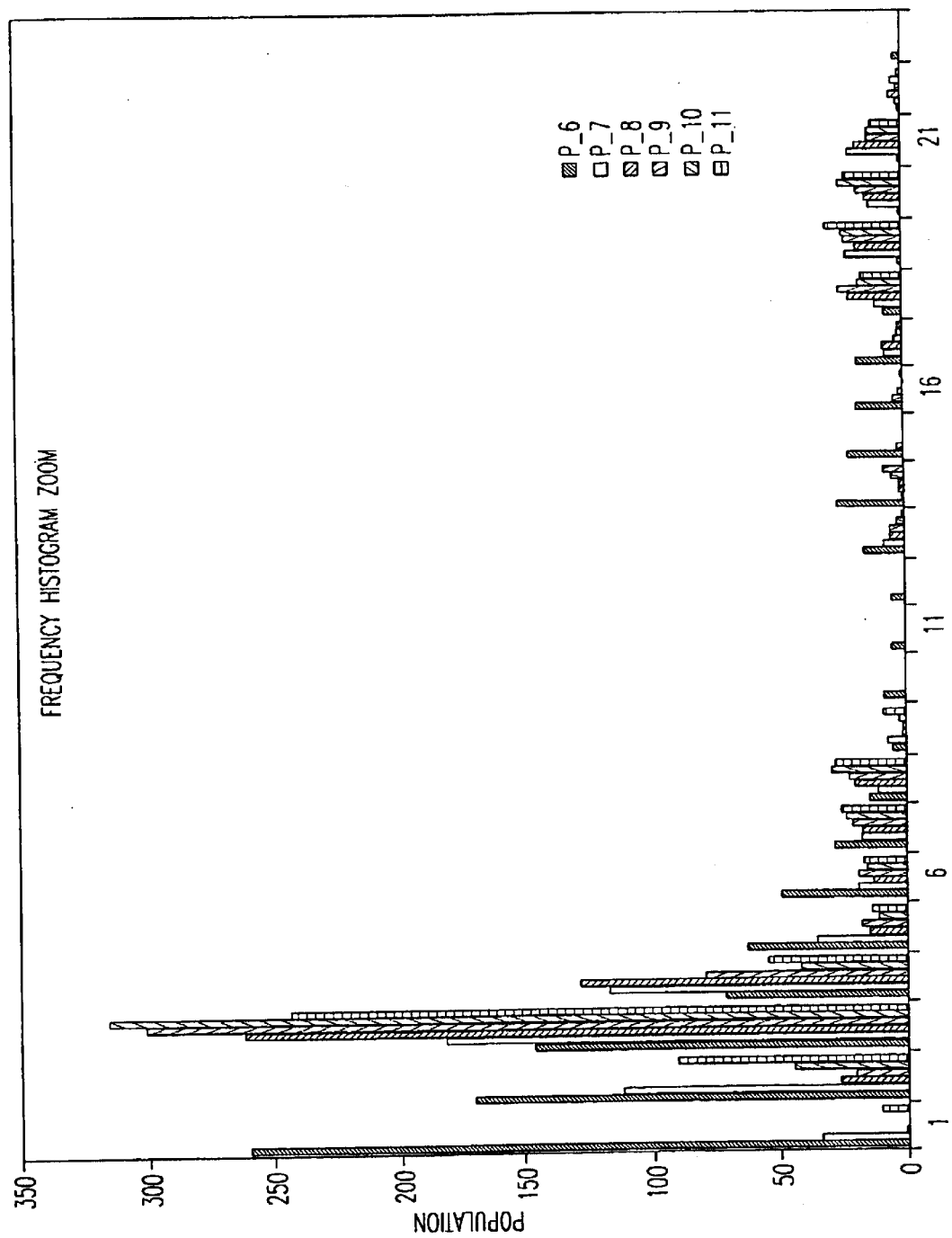

FIGS. 12a–12b are frequency histograms for images p6–p11, shown in FIGS. 6f–6k. The number of pixels between peaks are plotted on the x-axis in a range of 1 to 123. 123 is the highest value having a population, for image p6, as shown in Table C in FIGS. 13a–13g, which provides the population values for the number of pixels between peaks. Reviewing FIG. 12a, it can be clearly seen that most of the data appears in the first 25 values on the x-axis, and therefore these values are shown in the enlarged portion of the histogram shown in FIG. 12b.

A focused image has a sharp contrast between light and dark areas. An out of focus condition is represented by the loss of high frequency components. Therefore, the image with the highest population density at high frequency indicates the best focus. The data represented in FIGS. 12a and 12b is shown in Table C of FIGS. 13a–13g. Unlike illumination, the determination of the optimum focus does not use the entire population. Rather, only the first seven values are used to develop the entropy scores, shown in FIG. 14. Since slow edges are represented by low frequency values, only the first seven values are needed. According to FIG. 14, image p6 has the highest entropy score of 894, indicating that it is the best focused image.

During image capture and decoding operations, the imager 10 draws approximately 200–500 milliamperes of constant power at 4.2–5.25 V. Where the imager 10 interfaces with a portable data terminal (PDT), 4 to 6 V is normally specified at 200–500 mA, while the universal serial bus (USB) interface is specified at 4.2 to 5.25 volts at 100–500 mA.

Having described the preferred embodiments of the hand-held imager in accordance with the present invention, it is believed that other modifications, variations and changes will be suggested to those skilled in the art in view of the description set forth above, such as utilizing different focusing disk configurations, or other focusing configurations such as quintic lens. It is therefore to be understood that all such variations, modifications and changes are believed to fall within the scope of the invention as defined in the appended claims.

What is claimed is:

1. An optical symbology imager, comprising:
   a multiple line charge coupled device (CCD) having an active area;
   a focusing apparatus comprising a focusing disk with multiple optical positions to provide different focal lengths, said disk being rotatable so that each of said multiple optical positions can move into an optical path of said imager;
   a microprocessor for controlling said focusing apparatus and operation of said CCD, so that said CCD performs image capture producing image data for each of said multiple optical positions;
   said microprocessor controlling said CCD to shift out said image data substantially serially;
   said microprocessor evaluating transitions between light and dark data in a central set of multiple lines to produce a representative value for each of said multiple optical positions, wherein a largest representative value corresponds to one of said optical positions producing optimum focus; and
   wherein said CCD disposes of a first set of multiple lines without reading and digitizing said first set of multiple lines at a first rate of speed during focusing, and then samples a second subsequent set of multiple lines from said central set of scan lines at a second rate of speed less than said first rate of speed during focusing.

2. An optical symbology imager as recited in claim 1, wherein said representative value is produced by totaling a first seven to ten values from multiple values produced for each of said multiple focusing positions.

3. An optical symbology imager as recited in claim 1, wherein said optical symbology imager is hand-held.

4. An optical symbology imager as recited in claim 1, wherein said first set of multiple lines is 246 lines.

5. An optical symbology imager as recited in claim 1, wherein said second set of multiple lines is substantially ten lines.

6. An optical symbology imager in accordance with claim 1 wherein said multiple line CCD has a resolution of 659 by 494.

7. An optical symbology imager in accordance with claim 1, wherein said microprocessor only utilizes said central set of multiple lines to produce the optimum focus.

8. An optical symbology imager in accordance with claim 1, wherein said multiple optical positions are at least two.

9. An optical symbology imager in accordance with claim 1, wherein said multiple optical positions are eight.

10. An optical symbology imager in accordance with claim 1, wherein said multiple optical positions are twelve.

* * * * *